(12) United States Patent
Kanaya et al.

(10) Patent No.: US 6,169,593 B1
(45) Date of Patent: Jan. 2, 2001

(54) REFLECTION-TYPE LIQUID CRYSTAL DISPLAY DEVICE, METHOD FOR PRODUCING THE SAME, AND METHOD FOR PRODUCING CIRCUIT BOARD

(75) Inventors: Takayuki Kanaya, Kamo-gun; Motoji Shiota, Kashihara; Toshiaki Fujihara, Higashiosaka; Kiyoshi Inada, Joyo, all of (JP)

(73) Assignee: Sharp Kabushiki Kaisha, Osaka (JP)

( * ) Notice: Under 35 U.S.C. 154(b), the term of this patent shall be extended for 0 days.

(21) Appl. No.: 09/209,492

(22) Filed: Dec. 11, 1998

(30) Foreign Application Priority Data

Dec. 26, 1997 (JP) .................................................. 9-361001
Oct. 20, 1998 (JP) ................................................ 10-298968

(51) Int. Cl.[7] .............................. G02F 1/13; G02F 1/335
(52) U.S. Cl. ........................................... 349/187; 349/113
(58) Field of Search ................................... 349/187, 113, 349/139, 149; 438/30, 164, 299

(56) References Cited

U.S. PATENT DOCUMENTS

| 4,370,405 | * | 1/1983 | O'Toole et al. ....................... 430/312 |
| 5,591,480 | * | 1/1997 | Weisman et al. ....................... 216/13 |
| 5,825,437 | * | 10/1998 | Seo et al. .................................. 349/46 |
| 5,986,725 | * | 11/1999 | Kim et al. ................................. 349/43 |
| 6,023,319 | * | 2/2000 | Moom ..................................... 349/187 |
| 6,038,008 | * | 3/2000 | Kim et al. ................................ 349/138 |
| 6,072,550 | * | 6/2000 | Kim ........................................ 349/40 |
| 6,084,650 | * | 7/2000 | Sekiguchi ............................... 349/106 |

FOREIGN PATENT DOCUMENTS 7-325295 * 12/1995 (JP) .
9-90404 * 4/1997 (JP) .

* cited by examiner

*Primary Examiner*—Kenneth Parker
*Assistant Examiner*—Mike Qi
(74) *Attorney, Agent, or Firm*—Nixon & Vanderhye, P.C.

(57) ABSTRACT

A method for producing a reflection-type liquid crystal display device includes the steps of forming an ITO layer in the first substrate; patterning the ITO layer to form the top layer in the at least one of the terminal sections; forming a first protective layer so as to cover the top layer; forming a metal layer mainly formed of aluminum so as to cover the first protective layer; and at least partially removing the metal layer and the first protective layer to form a reflective section from the metal layer and expose only the flat area of the top surface of the top layer in the at least one of the terminal sections. Before the step of forming the first protective layer, only the flat area of the top surface of the layer is exposed in at least one of the terminal sections so as to allow the first protective layer to contact the top layer along only the flat area.

13 Claims, 20 Drawing Sheets

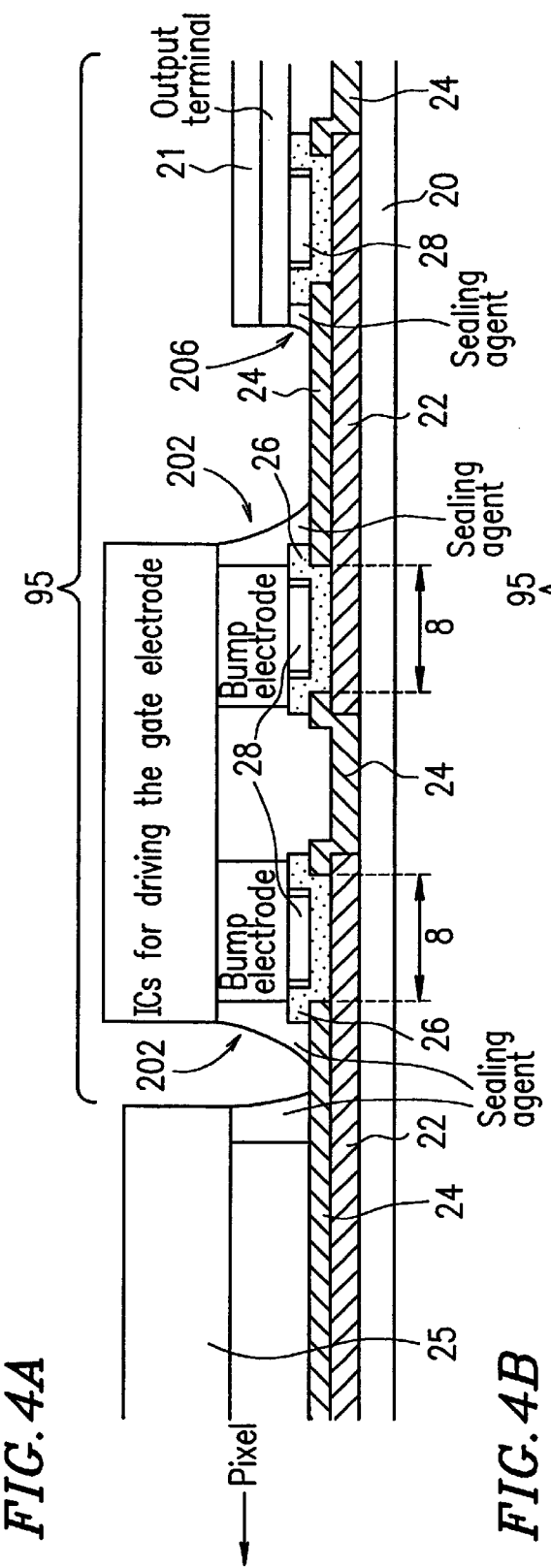
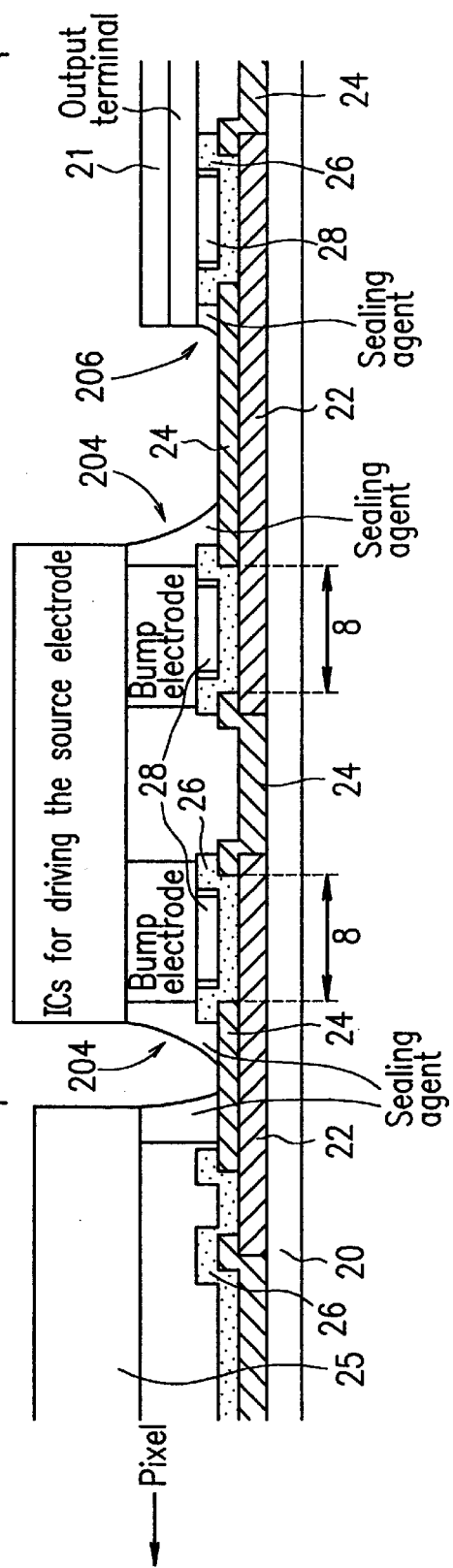
FIG. 4A
FIG. 4B

REFLECTION-TYPE LIQUID CRYSTAL DISPLAY DEVICE, METHOD FOR PRODUCING THE SAME, AND METHOD FOR PRODUCING CIRCUIT BOARD

BACKGROUND OF THE INVENTION

1. Field of the Invention

The present invention relates to a reflection-type liquid crystal display device in wide use as a display device in, for example, personal computers, mobile computer terminals, AV equipment, and car navigation devices, and a method for producing the same, and further to a method for producing a circuit board. In this specification, a liquid crystal display device is referred to as an "LCD device".

2. Description of the Related Art

Conventionally, an LCD device of a transmission-type including a backlight for supplying from a rear part thereof is the mainstream device. Recently, a reflection-type LCD device utilizing ambient light has been actively developed in order to fulfil the demands of lower power consumption, reduced weight and reduced thickness.

A reflection-type LCD device including a reflective plate outside the glass substrate results in blurred images. In order to solve this problem, most reflection-type LCD devices include a reflective plate inside the glass substrate so as to be in contact with the liquid crystal layer.

A reflection-type device has a terminal section for connection of ICs or a circuit board for driving the LCD panel and a terminal section for examining the LCD panel.

A structure of a conventional terminal section is disclosed by, for example, Japanese Laid-Open Publication No. 7-325295. FIG. 14A shows another conventional terminal section having a multiple-layer structure with steps, which is common today since more and more LCD devices are produced by a dry process, especially for film formation, in order to improve the precision. In order to produce conventional LCD devices which do not require high precision, a gate insulating layer is allowed to be formed at a prescribed position by a wet process. Therefore, an interlayer insulating layer does not exist in the terminal section. In contrast, in the case of a dry process, an interlayer insulating layer is formed substantially entirely on a base plate and thus the terminal section has a multiple-layer structure with the steps.

With reference to FIG. 14A, a conventional terminal section for connecting a gate signal line and a gate driving IC to each other will be described. The terminal section includes an insulating plate 120, a gate signal line 122 provided on the insulating plate 120, and the gate insulating layer 124 provided substantially entirely on the glass plate 120. The insulating layer 124 is formed by a dry process. The gate insulating layer 124 acts as an interlayer insulating layer between the gate signal line 122 and the source signal line (not shown). The terminal section further includes a conductive layer 126 provided on the gate signal line 122 so as to overlap an end of the gate insulating layer 124. The conductive layer 126 is formed of an identical material as that of the source signal line and is disconnected from the source signal line. An ITO layer 128 is provided on the conductive layer 126. As shown here, the conventional terminal section has a multiple-layer structure with steps and the ITO layer 128 is provided at the top.

When such a conventional terminal section is applied to a reflection-type LCD device, the following problem occurs. A reflective layer (not shown) which is formed of Al and is equivalent to the reflective plate (acting also as a pixel electrode) is provided in the terminal section in addition to a display area (not shown). When the reflective layer is patterned to a prescribed shape, the ITO layer 128 in the terminal section is at least partially removed together with the reflective layer, causing many inconveniences.

In order to solve these inconveniences, as shown in FIG. 14B, an insulating resin layer 130 is provided on the ITO layer 128 so as to avoid direct contact between the ITO layer 128 and the reflective layer 132 (FIG. 14C) which is to be provided on the insulating resin layer 130 as shown in FIG. 14C. Even by such a structure, since the ITO layer 128 has an uneven surface, a part of the ITO layer 128 is not covered by the insulating resin layer 130 and is in direct contact with the reflective layer 132.

When the reflective layer 132 is removed, electrolytic corrosion at least partially removes the ITO layer 128, which significantly reduces the production yield.

SUMMARY OF THE INVENTION

According to one aspect of the invention, a method for producing a reflection-type liquid crystal display device, including a first substrate; a second substrate; and a display medium layer interposed between the first substrate and the second substrate is provided. The first substrate includes a first electrode for applying a voltage to the display medium layer. The second substrate includes a second electrode for applying a voltage to the display medium layer. The first substrate includes a light reflective section in the vicinity of the display medium layer for reflecting light which is incident on the reflection-type liquid crystal display device through the second substrate, and includes a plurality of terminal sections for supplying a voltage to the first electrode and the second electrode. At least one of the plurality of terminal sections has a top layer formed of ITO, only a flat area of a top surface of the top layer being exposed. The method includes the steps of forming an ITO layer in the first substrate; patterning the ITO layer to form the top layer in the at least one of the terminal sections; forming a first protective layer so as to cover the top layer; forming a metal layer mainly formed of aluminum so as to cover the first protective layer; and at least partially removing the metal layer and the first protective layer to form a reflective section from the metal layer and expose only the flat area of the top surface of the top layer in the at least one of the terminal sections. Before the step of forming the first protective layer, only the flat area of the top surface of the layer is exposed in at least one of the terminal sections so as to allow the first protective layer to contact the top layer along only the flat area.

According to another aspect of the invention, a method for producing a reflection-type liquid crystal display device, including a first substrate; a second substrate; and a display medium layer interposed between the first substrate and the second substrate is provided. The first substrate includes a plurality of reflection pixel electrodes for applying a voltage to the display medium layer. The second substrate includes a counter electrode located opposed to the plurality of reflection pixel electrodes. The first substrate includes an insulating plate, and also includes, above a surface of the insulating plate opposed to the display medium layer, a plurality of thin film transistors respectively connected to the plurality of reflection pixel electrodes, a plurality of gate signal lines and a plurality of source signal lines connected to respective thin film transistors, a gate terminal section for supplying a scanning signal to the gate signal lines, a source terminal section for supplying a display signal to the source signal lines, and a common transfer terminal section for supplying a common signal to the counter electrode. The thin film transistors each include a gate electrode connected to the respective gate signal line, a source electrode connected to the respective source signal line, and a drain electrode connected to the respective reflection pixel electrode. At least one of the gate terminal section, the source terminal section and the common transfer terminal section includes a top layer formed of ITO, only a flat area of a top surface of the top layer being exposed. The method includes the steps of forming a first conductive layer on the insulating plate; patterning the first conductive layer to form the gate signal lines and the gate electrodes; forming a gate insulating layer substantially entirely on the insulating plate so as to cover at least the gate signal lines and the gate electrodes; forming an ITO layer above the insulating plate; patterning the ITO layer to form the top layer in the at least one of the terminal sections; forming a first protective layer so as to cover the top layer; forming a metal layer mainly formed of aluminum so as to cover the first protective layer; and at least partially removing the metal layer and the first protective layer to form the reflection pixel electrodes from the metal layer and expose only the flat area of the top surface of the top layer in the at least one of the terminal sections. Before the step of forming the first protective layer, only the flat area of the top surface of the layer is exposed in at least one of the terminal sections so as to allow the first protective layer to contact the top layer along only the flat area.

According to still another aspect of the invention, a method for producing a reflection-type liquid crystal display device, including a first substrate; a second substrate; and a display medium layer interposed between the first substrate and the second substrate is provided. The first substrate includes a plurality of reflection pixel electrodes for applying a voltage to the display medium layer. The second substrate includes a counter electrode located opposed to the plurality of reflection pixel electrodes. The first substrate includes an insulating plate, and also includes, above a surface of the insulating plate opposed to the display medium layer, a plurality of thin film transistors respectively connected to the plurality of reflection pixel electrodes, a plurality of gate signal lines and a plurality of source signal lines connected to respective thin film transistors, a gate terminal section for supplying a scanning signal to the gate signal lines, a source terminal section for supplying a display signal to the source signal lines, and a common transfer terminal section for supplying a common signal to the counter electrode. The thin film transistors each include a gate electrode connected to the respective gate signal line, a source electrode connected to the respective source signal line, and a drain electrode connected to the respective reflection pixel electrode. At least one of the gate terminal section, the source terminal section and the common transfer terminal section includes a top layer formed of ITO, only a flat area of a top surface of the top layer being exposed. The method include the steps of forming a first conductive layer on the insulating plate; patterning the first conductive layer to form the gate signal lines and the gate electrodes; forming a gate insulating layer substantially entirely on the insulating plate so as to cover at least the gate signal lines and the gate electrodes; forming an opening through the gate insulating layer in at least one of the terminal sections; forming an ITO layer above the insulating plate; patterning the ITO layer to form the top layer in the at least one of the terminal sections; forming a first protective layer so as to cover the top layer; forming a metal layer mainly formed of aluminum so as to cover the first protective layer; and at least partially removing the metal layer and the first protective layer to form the reflection pixel electrodes from the metal layer and expose only the flat area of the top surface of the top layer in the at least one of the terminal sections. Before the step of forming the first protective layer, only the flat area of the top surface of the layer is exposed in at least one of the terminal sections so as to allow the first protective layer to contact the top layer along only the flat area. The top layer is formed in the opening.

In one embodiment of the invention, the top layer has a stepped peripheral portion, and the method further includes the step of forming a second protective layer so as to cover the stepped peripheral portion and expose only the flat area of the top surface of the top layer before the step of forming the first protective layer.

In one embodiment of the invention, the step of forming the top layer includes the step of forming the top layer on the gate insulating layer, and the top layer is electrically connected to the gate signal lines through a through-hole formed in an area other than the at least one of the terminal sections.

According to still another aspect of the invention, a method for producing a circuit board, including an insulating plate and a terminal section formed on the base plate, the terminal section including a top layer formed of ITO, only a flat area of a top surface of the top layer being exposed is provided. The method includes the steps of forming an ITO layer above the insulating plate; patterning the ITO layer to form the top layer in the terminal section; forming a first protective layer so as to cover the top layer; forming a metal layer mainly formed of aluminum so as to cover the first protective layer; and at least partially removing the metal layer and the first protective layer to expose only the flat area of the top surface of the top layer in the terminal section. Before the step of forming the first protective layer, only the flat area of the top surface of the layer is exposed in the terminal section so as to allow the first protective layer to contact the top layer along only the flat area.

According to still another aspect of the invention, a reflection-type liquid crystal display device includes a first substrate; a second substrate; and a display medium layer interposed between the first substrate and the second substrate. The first substrate includes a plurality of reflection pixel electrodes for applying a voltage to the display medium layer. The second substrate includes a counter electrode located opposed to the plurality of reflection pixel electrodes. The first substrate includes an insulating plate; and also includes, above a surface of the insulating plate opposed to the display medium layer, an ITO layer; a first protective layer; a plurality of thin film transistors formed of a metal layer mainly containing aluminum and provided on the first protective layer, the thin film transistors being connected to the plurality of reflection pixel electrodes; gate signal lines and source signal lines connected to the thin film transistors; a gate terminal section for supplying a scanning signal to the gate signal lines, a source terminal section for supplying a display signal to the source signal lines, and a common transfer terminal section for supplying a common signal to the counter electrode. At least one of the gate terminal section, the source terminal section and the common transfer terminal section includes a top layer formed of ITO, only a flat area of a top surface of the top layer being exposed. The first substrate further includes a gate insulating layer for covering at least the gate signal lines and gate electrodes. The gate insulating layer has an opening in the at least one of the terminal sections. The top layer is provided in the opening.

In one embodiment of the invention, the top layer has a stepped peripheral portion, and the reflection-type liquid crystal display device further includes a second protective layer for covering the stepped peripheral portion and exposing only the flat area of the top surface of the top layer.

In one embodiment of the invention, the reflection-type liquid crystal display device further includes another conductive layer formed of an identical material as that of the source signal lines, the top layer being provided on the another conductive layer.

In one embodiment of th e invention, the top layer is provided inside the gate insulating layer so that an outer periphery of the top layer is distanced from an inner periphery of the gate insulating layer by more than zero and about 2 $\mu$m or less.

According to still another aspect of the invention, a reflection-type liquid crystal display device includes a first substrate; a second substrate; and a display medium layer interposed between the first substrate and the second substrate. The first substrate includes a plurality of reflection pixel electrodes for applying a voltage to the display medium layer. The second substrate includes a counter electrode located opposed to the plurality of reflection pixel electrodes. The first substrate includes an insulating plate; and also includes, above a surface of the insulating plate opposed to the display medium layer, an ITO layer; a first protective layer; a plurality of thin film transistors formed of a metal layer mainly containing aluminum and provided on the first protective layer, the thin film transistors being connected to the plurality of reflection pixel electrodes; gate signal lines and source signal lines connected to the thin film transistors; a gate terminal section for supplying a scanning signal to the gate signal lines, a source terminal section for supplying a display signal to the source signal lines, and a common transfer terminal section for supplying a common signal to the counter electrode. At least one of the gate terminal section, the source terminal section and the common transfer terminal section includes a top layer formed of ITO, only a flat area of a top surface of the top layer being exposed. The first substrate further includes a gate insulating layer for covering at least the gate signal lines and gate electrodes. The top layer is provided on the gate insulating layer and is connected to the gate signal lines through a through-hole formed in an area other than the at least one of the terminal sections.

According to the present invention, a circuit board has a top layer formed of ITO. Only a flat area of a top surface of the top layer is exposed before the formation of the first protective layer, so that the first protective layer contacts the top layer along only the flat area. After the first protective layer is formed, a metal layer is formed so as to cover the first protective layer. Then, the first protective layer and the metal layer are removed at least partially, thereby exposing the only flat area of the top surface of the top layer. Thus, removal of the ITO layer due to electrolytic corrosion is prevented.

In the case where the top layer of the terminal section is provided on an insulating layer (for example, a gate insulating layer) and connected to the signal line (e.g., gate signal line) below the insulating layer through the through-hole formed in the insulating layer, the top layer is easily connected to the terminal electrode in the circuit board. The freedom of design is improved regarding the positional relationship between the lines and the terminal sections.

The top layer formed of ITO can have a stepped peripheral portion and a second protective layer for covering the stepped peripheral portion and exposing only a flat area of the top layer can be formed before the first protective layer is formed. In such a case, the second protective layer protects the top layer and the signal lines formed in the peripheral area of the second conductive layer, and the first protective layer contacts the top layer along only the exposed flat area. Accordingly, when the metal layer and the first protective layer are at least partially removed, removal of the ITO due to the electrolytic corrosion is prevented.

In the case where the second conductive layer is provided above the first conductive layer with the gate insulating layer being interposed therebetween, the second conductive layer is patterned to be source signal lines and the source electrodes, and the top layer of at least one of the terminal sections is formed on the second conductive layer, electric connection is improved to secure signal supply.

In an active matrix reflection-type liquid crystal display device including reflective sections (reflection pixel electrodes) formed of a metal layer mainly containing aluminum and thin film transistors according to the present invention, the gate terminal section, the source terminal section and the common transfer terminal section are formed by the same step of forming the thin film transistors, the reflective sections and the signal lines. Thus, the terminal sections having the above-described features are formed without significantly increasing the number of production steps. The structure of the terminal sections is varied in accordance with the structures of the thin film transistors, the reflective sections and the signal lines and the production method.

Thus, the invention described herein makes possible the advantage of providing a reflection-type LCD device for preventing disadvantages caused by removal of an ITO layer included in a terminal section and a method for producing the same, and a method for producing a circuit board.

This and other advantages of the present invention will become apparent to those skilled in the art upon reading and understanding the following detailed description with reference to the accompanying figures.

BRIEF DESCRIPTION OF THE DRAWINGS

FIGS. 4A and 4B are cross-sectional views of a reflection-type LCD device in a first example according to the present invention;

DESCRIPTION OF THE PREFERRED EMBODIMENTS

Hereinafter, the present invention will be described by way of illustrative examples with reference to drawings.

Figure 1:
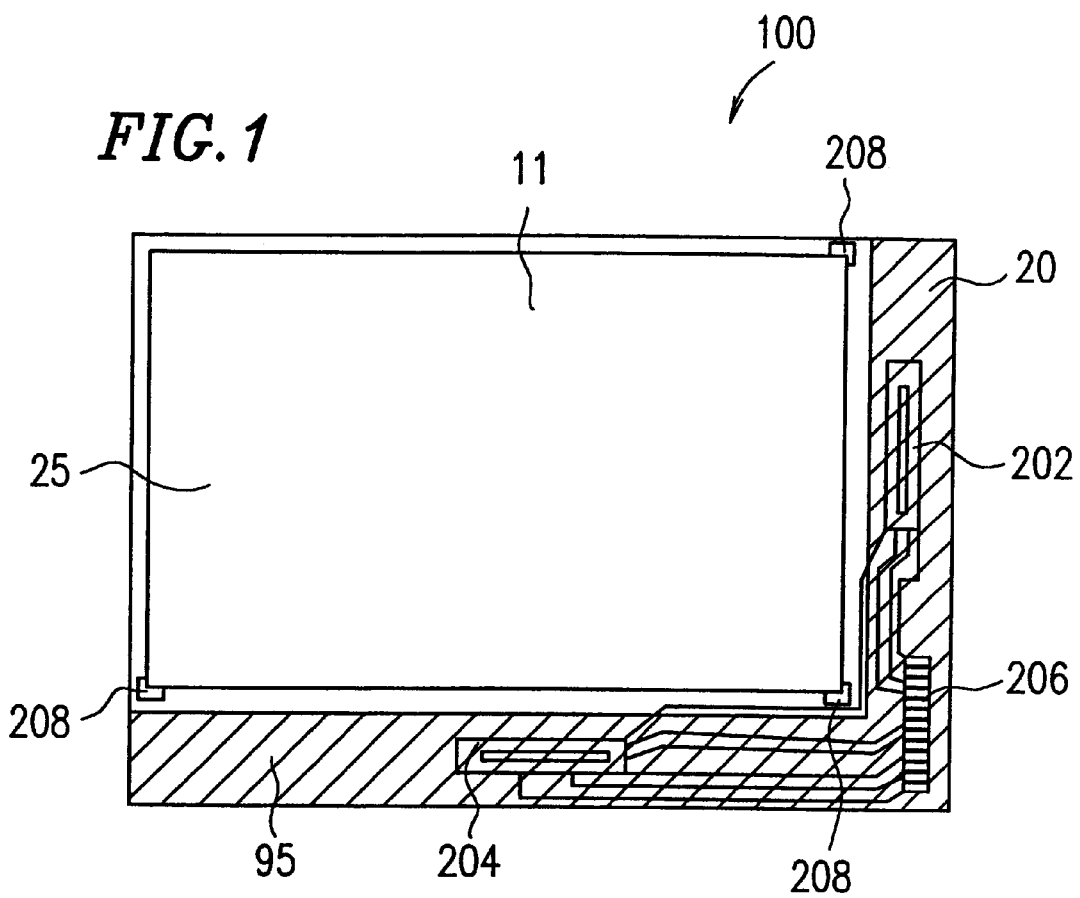
FIG. 1 is a plan view of a reflection-type LCD device according to the present invention.

FIG. 1 is a plan view of a reflection-type LCD device 100 according to the present invention in the state before driving ICs and a driving circuit board are provided.

The reflection-type LCD device 100 includes a first substrate including a first insulating plate 20 (also referred to as a "base plate" or "active matrix plate"), a second substrate including a second insulating plate 25 (also referred to as a "counter plate"), and a display medium layer (not shown) interposed between the first and second insulating plates 20 and 25. Two-dimensionally, the first insulating plate 20 is larger than the second insulating plate 25. The first substrate includes a plurality of pixel electrodes (not shown) provided above the first insulating plate 20, and the second substrate includes a single counter electrode (not shown) facing the pixel electrodes and provided on the second insulating plate 25.

Although not shown in FIG. 1, the first substrate includes the following structure provided between the first insulating plate 20 and the display medium layer. A plurality of gate signal lines and a plurality of source signal lines cross each other. A thin film transistor (hereinafter, referred to as a "TFT") is provided at each intersection of gate signal lines and source signal lines. Each TFT includes a gate electrode, a source electrode and a drain electrode. The TFTs respectively correspond to the plurality of pixel electrodes mentioned above. The drain electrode of each TFT is electrically connected to the respective pixel electrode. The gate electrode of each TFT is connected to the respective gate signal line, and the source electrode of each TFT is connected to the respective source signal line.

The first insulating plate 20 has a peripheral area 95 which is not covered by the second insulating plate 25. Provided on the peripheral area 95 are, for example, a gate terminal section 202 for supplying a scanning signal to the gate signal lines, a source terminal section 204 for supplying a display signal to the source signal lines, and a circuit board terminal section 206 which is electrically connected to gate signal lines and the source signal lines connected to the gate terminal section 202 and the source terminal section 204 and which are also connected to a driving circuit board (not shown), and a common transfer terminal section 208 for supplying a common signal to the counter electrode.

An area where the counter electrode faces the plurality of pixel electrode substantially forms a display area 11.

In examples according to the present invention described below, the terminal sections 202, 204, 206 and 208 each have a top layer formed of ITO, and only a flat area of the top layer is exposed. In order to obtain the advantage of the present invention, it is sufficient that at least one of the terminal sections 202, 204, 206 and 208 has a top layer formed of ITO, only a flat area of which is exposed. In the case where the top layer formed of ITO has a stepped top surface, the steps are covered by a protective layer so as to expose only the flat area. In the case where the top layer formed of ITO has a flat top surface, the entire top layer including the top surface and side surfaces can be exposed.

A method for producing the reflection-type LCD device 100 will be described with reference to FIGS. 2A through 2H. FIGS. 2A through 2H show only the terminal section. The structure of the terminal section shown in FIGS. 2A through 2H can be common to the terminal sections 202, 204, 206 and 208.

Figure 2A:
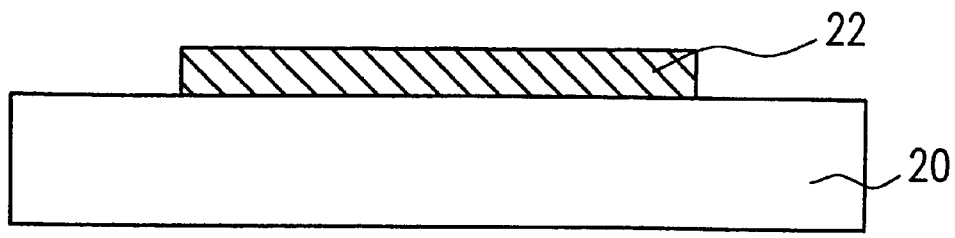
FIGS. 2A through 2H are cross-sectional views illustrating a method for producing the reflection-type LCD device shown in FIG. 1.

First, as shown in FIG. 2A, a first conductive layer is formed on the first insulating plate 20 and patterned to form a gate signal line and a gate electrode connected thereto (not shown). This patterning also forms a first terminal electrode layer 22 (the conductive layer closest to the first insulating plate 20 among all the conductive layers included in the terminal section; FIG. 1). The first terminal electrode layer 22 can be formed to be a part of the gate terminal section 202, in which case the first terminal electrode layer 22 is continuous from the gate signal lines and the gate electrodes. The first conductive layer can also be patterned to be another first terminal electrode layer as a part of another terminal section (i.e., the source terminal section 204, the circuit board terminal section 206 or the common transfer terminal section 208; FIG. 1), in which case the first conductive layer is electrically disconnected to the gate signal lines. The first conductive layer can also be used as a light blocking layer for protecting the terminal sections 202, 204, 206 and 208 and the ICs connected to the terminal sections 202, 204, 206 and 208 against light.

Figure 2B:
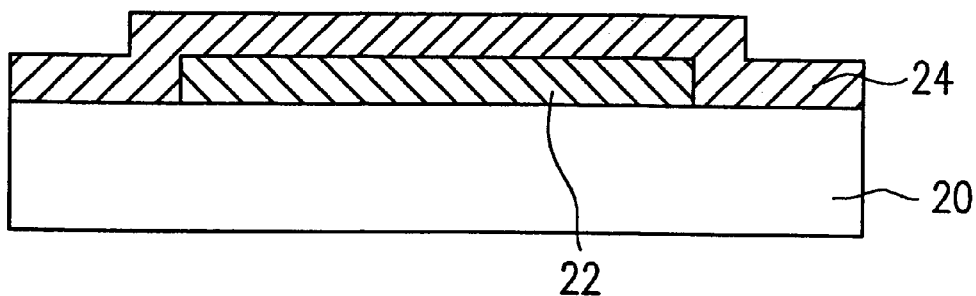

Then, as shown in FIG. 2B, an insulating layer is formed on the first insulating plate 20 so as to cover the gate signal lines, gate electrodes and the first terminal electrode layer 22 and patterned by dry etching, thereby forming the gate insulating layer 24. Thereafter, in the display area 11 (FIG. 1), TFTs are formed by deposition, patterning and impurity implantation of a semiconductor layer of amorphous silicon.

Figure 2C:
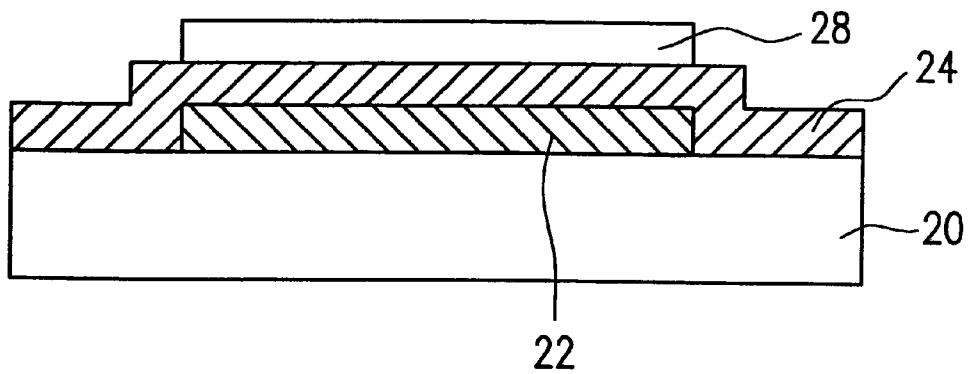

As shown in FIG. 2C, an ITO layer is formed on the gate insulating layer 24 and patterned, thereby forming a top terminal electrode layer 28. The top terminal electrode layer 28 has a flat top surface. At this point, the ITO layer can be used also to form source electrodes and source signal lines. A second conductive layer (not shown) of titanium (Ti) can be formed between the first terminal electrode layer 22 and the top terminal electrode layer 28.

Figure 2D:
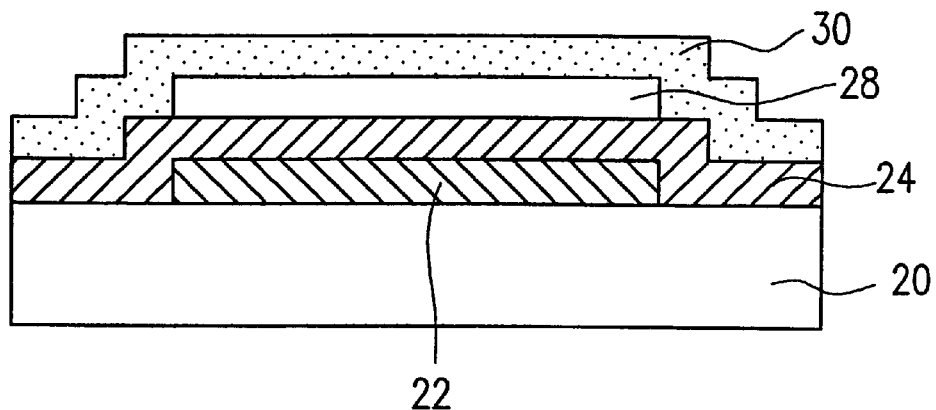
Figure 2E:
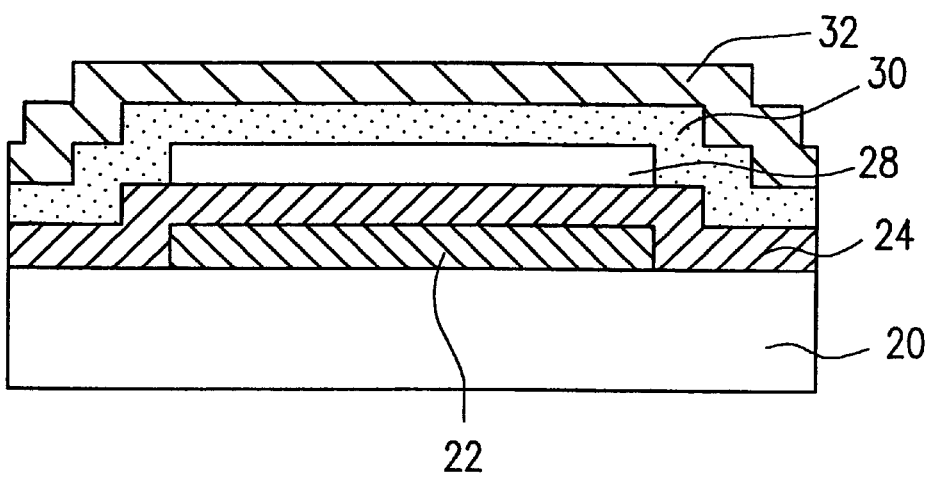

As shown in FIG. 2D, a first protective layer 30 of a photosensitive resin is formed substantially entirely on the first insulating plate 20 so as to cover the gate insulating layer 24 and the top terminal electrode layer 28. Then, as shown in FIG. 2E, a metal layer 32 mainly of aluminum (Al) is formed substantially entirely on the first insulating plate 20 so as to cover the gate insulating layer 24, the top terminal electrode layer 28 and the first protective layer 30. The metal layer 32 is provided for forming reflective sections (typically, reflective pixel electrodes) for reflecting light incident on the LCD device 100. The first protective layer 30 is provided for forming protrusions and depressions in the reflective sections in order to optimize the reflection characteristics of the surface of the reflective sections in the display area 11.

Figure 2F:
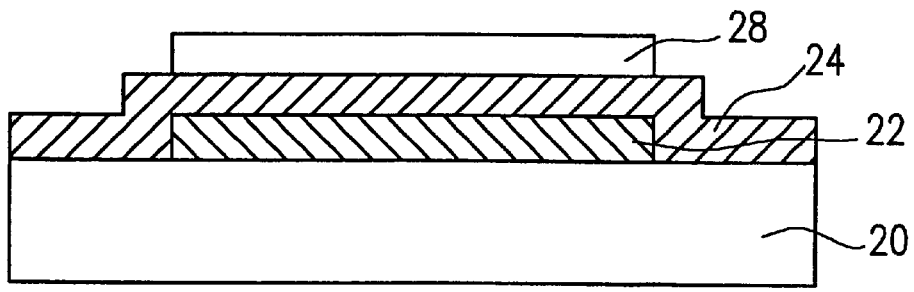

Then, the metal layer 32 and the first protective layer 30 are at least partially removed. As a result, the metal layer 32 is formed into the reflective pixel electrodes in the display area (not shown). As shown in FIG. 2F, the top terminal electrode layer 28 is exposed in the terminal section. The top surface of the top terminal electrode layer 28 is flat. Electrical connection between the top terminal electrode layer 28 and the first terminal electrode layer 22 (and optionally the second terminal electrode layer; not shown) can be performed in an area other than the terminal section.

Figure 2G:
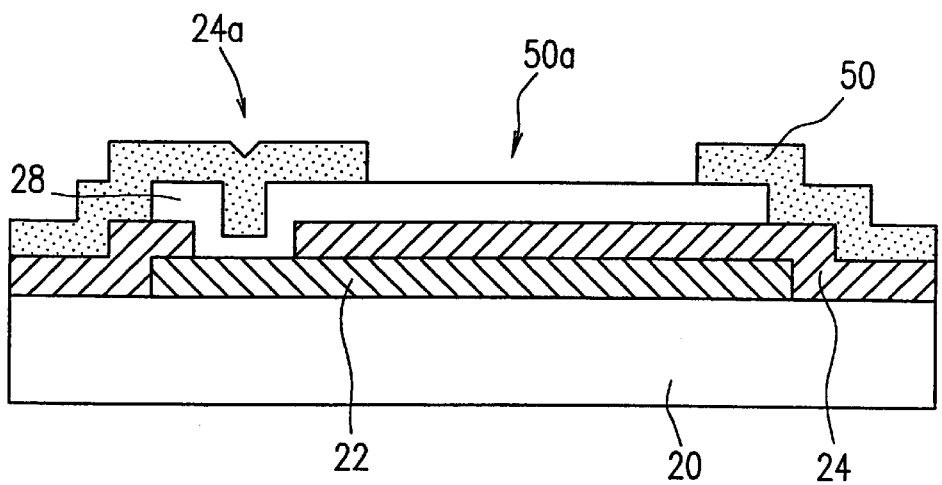

For example, as shown in FIG. 2G, the top terminal electrode layer 28 and the first terminal electrode layer 22 can be connected to each other through a through-hole 24a in the gate insulating layer 24.

Figure 2H:
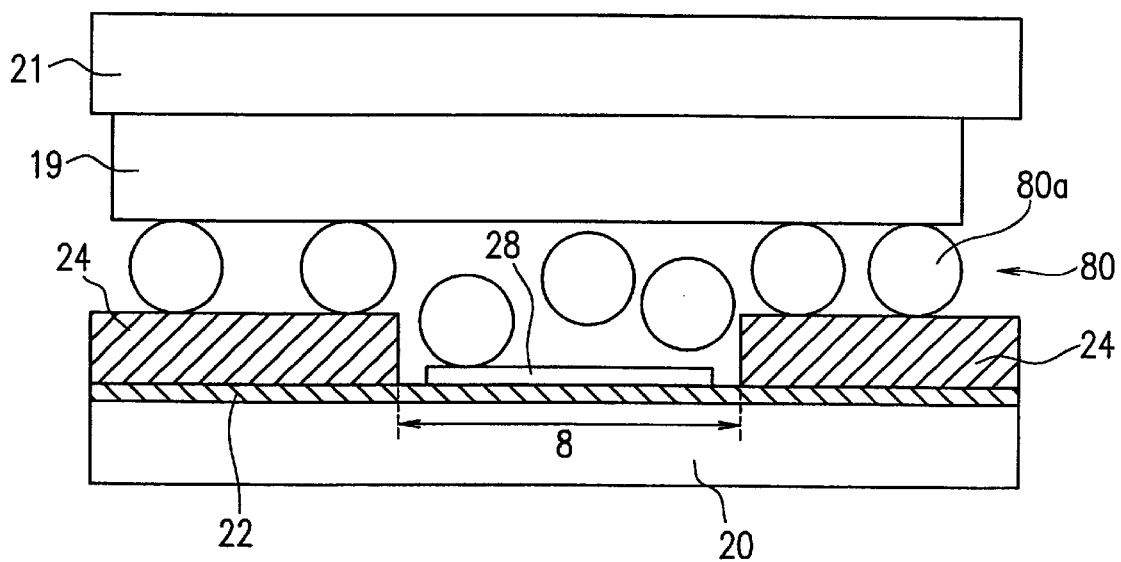

In the case where, as shown in FIG. 2H, a bump electrode 19 of the driving circuit board 21 is connected to the first terminal electrode layer 22 by an anisotropic conductive film (ACF) 80 in a reflection-type LCD device including the gate insulating layer 24 having an opening 8, when the thickness of the gate insulating layer 24 (e.g., about 300 nm) is greater than the thickness of the top terminal electrode layer 28 (e.g., about 70 nm), conductive particles 80a of the anisotropic conductive film 80 are not in sufficient contact with the bump electrode 19. Accordingly, insufficient electrical contact may undesirably occur between the bump electrode 19 and the first terminal electrode layer 22.

However, in the case where, as shown in FIG. 2G, the gate insulating layer 24 has the through-hole 24a and a protective layer 50 has an opening 50a, the top terminal electrode layer 28 is connected to the first terminal electrode layer 22 through the through-hole 24a, and the top terminal electrode layer 28 is connected to the driving circuit board 21 (FIG. 2H) through the opening 50a. In this case, the protective layer 50 preferably has a thickness of about 100 nm. The protective layer 50 can be eliminated. The thickness of the protective layer 50 is preferably about 700 nm or less.

Under certain conditions, it is preferable that the gate insulating layer 24 does not have a through-hole in the source terminal section 204 (FIG. 1). For example, in the case where the first conductive layer 22 (as well as the gate electrodes and the gate signal lines) is formed of an anodizable metal (e.g., Ta), the gate insulating layer 24 can include an insulating layer obtained by anodizing the first conductive layer 22 and an insulating layer formed thereon (e.g., silicon nitride) in order to obtain a high density. When the gate insulating layer 24 includes such an anodized layer, the structure of the gate insulating layer of the source terminal section 204 is different from the structure of the gate insulating layer in the gate terminal section 202. Since the first conductive layer 22 of the gate terminal section 202 is electrically connected to the gate electrodes and the gate signal lines, the first conductive layer 22 is anodized in the same step as the gate electrodes and the gate signal lines. As a result, the gate insulating layer 24 includes such an anodized layer. In contrast, the first conductive layer of the source terminal section, which is provided in an island disconnected from the gate electrodes and the gate lines, is not anodized. Accordingly, the gate insulating layer 24 in an area included in the source terminal section 204 does not include an anodized layer. As described above, under certain conditions, the gate insulating layer 24 in which through-holes need to be formed has different structures in an area included in the gate terminal section 202 from an area included in the source terminal section 204. When dry etching is used for forming the through-holes, it is sometimes difficult to optimize the dry etching conditions for these different areas of the insulating layer 24. Dry etching conditions which are optimum to one of the areas may not be optimum for the other. As a result, satisfactory through-holes are not formed, or the formation of the through-holes damages the first conductive layer 22, which forms the bottom of the through-holes. In order to solve this problem, it is preferable that through-holes are formed only in the area of the gate insulating layer 24 included in the gate terminal section 202 and not in the area included in the source terminal section 204.

Under certain conditions, as shown in FIGS. 4A and 4B described below, through-holes can be formed in the gate insulating layer 24 both in the areas included in the gate terminal section 202 and the source terminal section 204. Such a structure is realized by, for example, forming a gate insulating layer of the same structure in the gate and source terminal sections 202 and 204 or by optimizing the dry etching conditions for these different areas of the insulating layer 24.

A method for producing another reflection-type LCD device according to the present invention will be described with reference to FIGS. 3A through 3F. Elements which are identical with those described with reference to FIGS. 1 through 2H bear identical reference numerals and detailed descriptions thereof will be omitted. In this reflection-type LCD device, the gate insulating layer 24 has an opening. FIGS. 3A through 3F show only the terminal section.

Figure 3A:
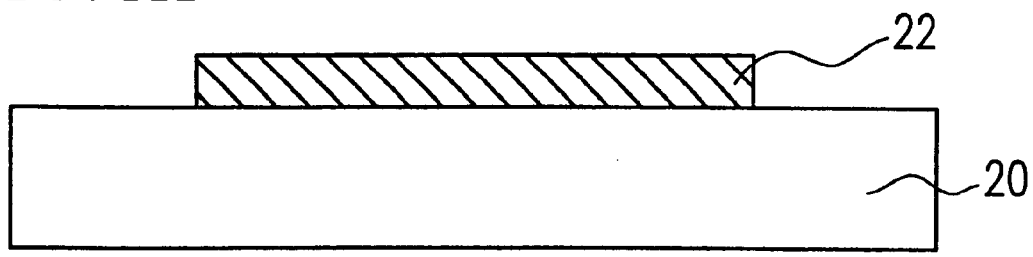
FIG. 3A through 3F are cross-sectional views illustrating a method for producing another reflection-type LCD device according to the present invention.

As shown in FIG. 3A, the first terminal electrode layer 22 is formed on the first insulating plate 20.

Figure 3B:
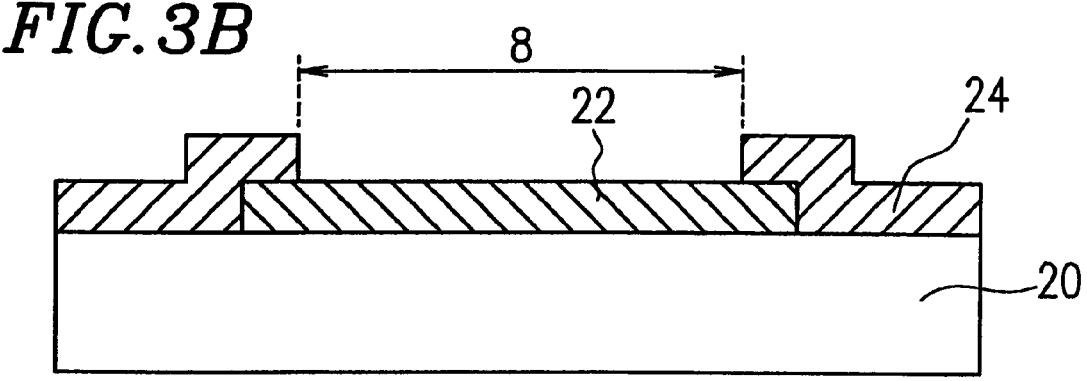

Then, as shown in FIG. 3B, the gate insulating layer 24 is formed substantially entirely on the first insulating plate 20 so as to cover the first terminal electrode layer 22. The gate insulating layer 24 is patterned to form an opening 8.

Figure 3C:
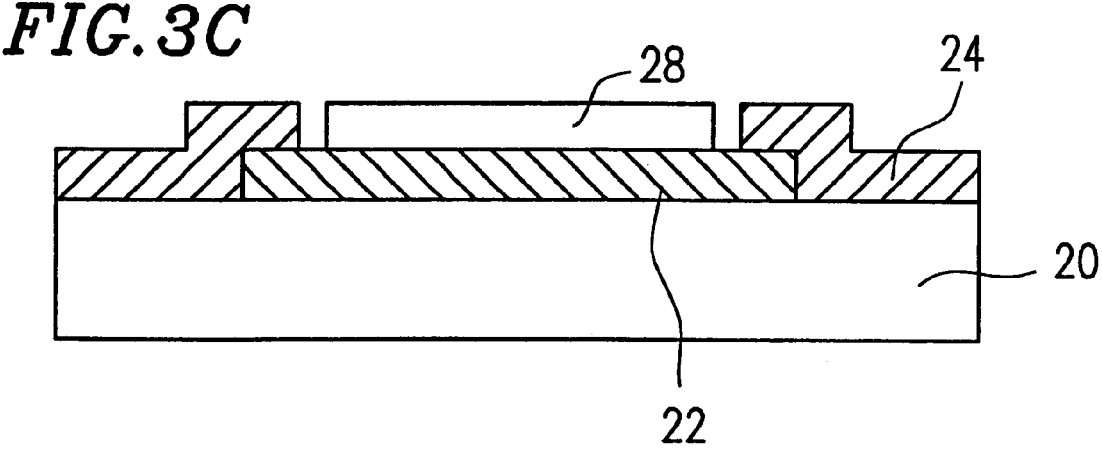

As shown in FIG. 3C, a top terminal electrode layer 28 is formed of ITO in the opening 8 on the first terminal electrode layer 22 by patterning. The top terminal electrode layer 28 has a flat top surface.

Figure 3D:
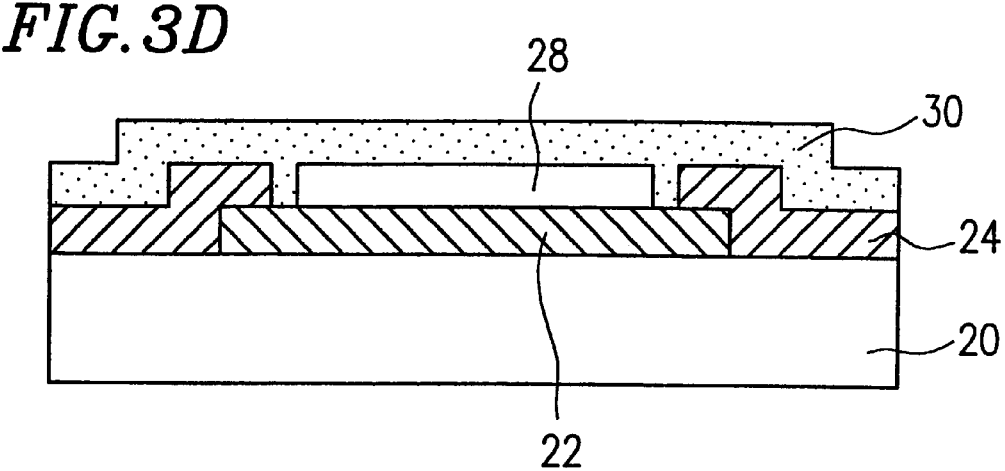
Figure 3E:
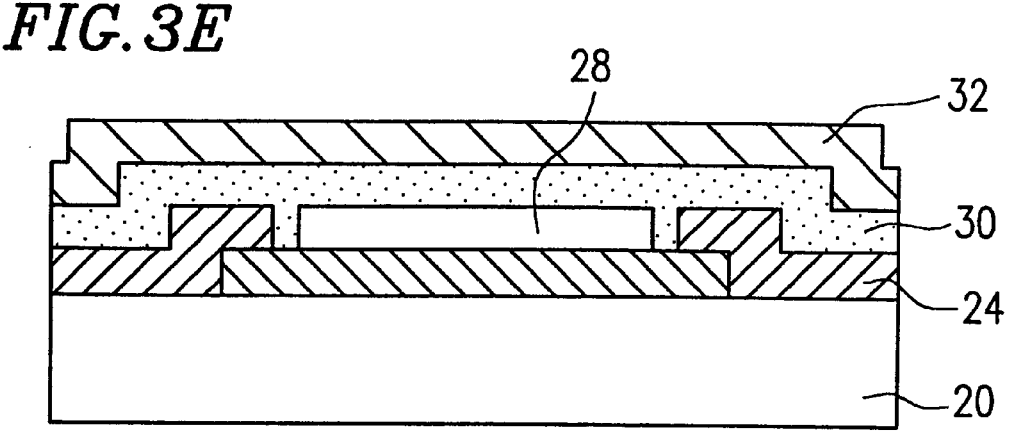

As shown in FIG. 3D, a first protective layer 30 is formed on the gate insulating layer 24 so as to cover the top terminal electrode layer 28. Then, as shown in FIG. 3E, a metal layer 32 is formed on the first protective layer 30. A surface of the first protective layer 30 is formed to have protrusions and depressions so that a surface of the reflective sections (or reflective pixel electrodes) has protrusions and depressions in the display area (not shown).

Figure 3F:
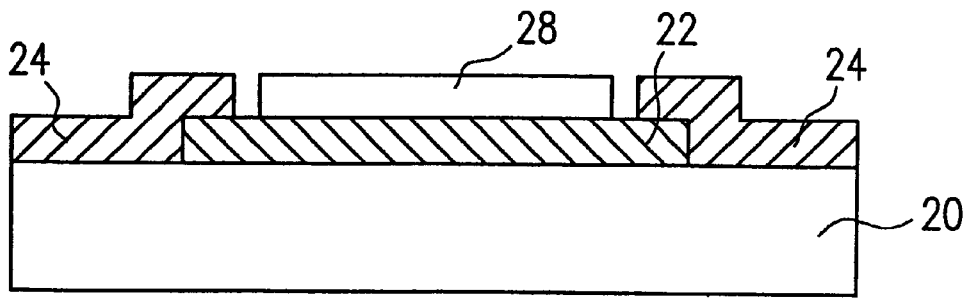

Then, as shown in FIG. 3F, the metal layer 32 and the first protective layer 30 are at least partially removed. As a result, the metal layer 32 is formed into the reflective pixel electrodes in the display area. The top terminal electrode layer 28 of at least one terminal section is exposed.

According to the present invention, before the first protective layer 30 is formed, only a flat area of the top surface of the top terminal electrode layer 28 is exposed so that only the flat top surface of the top terminal electrode layer 28 is in contact with the first protective layer 30. The top terminal electrode layer 28 can be connected to the first terminal electrode layer 22 (and optionally the second terminal electrode layer; not shown) by various methods. An appropriate method can be selected in accordance with the use of the terminal section. Specific methods will be described in the following examples.

In accordance with the production methods described above, direct contact of the metal layer 32 and the top terminal electrode layer 28 is avoided. As a result, when the metal layer 32 and the first protective layer 30 are at least partially removed, removal of the top terminal electrode layer 28 due to electrolytic corrosion is prevented.

Hereinafter, specific examples according to the present invention will be described.

EXAMPLE 1

A reflection-type LCD device in a first example according to the present invention has substantially the same structure as that of the reflection-type LCD device 100 shown in FIG. 1. For convenience, the reflection-type LCD device in this example is described with reference numeral 100 and with reference to FIG. 1.

As shown in FIG. 1, the reflection-type LCD device 100 includes a first insulating plate 20 (also referred to as an "active matrix plate"), a second insulating plate 25 (also referred to as a "counter plate"), and a display medium layer (not shown) interposed between the first and second insulating plates 20 and 25. Two-dimensionally, the first insulating plate 20 is larger than the second insulating plate 25. The first plate 20 has a plurality of pixel electrodes (not shown) provided thereon, and the second insulating plate 25 has a single counter electrode (not shown) facing the pixel electrodes.

Although not shown in FIG. 1, the following structure is provided between the first insulating plate 20 and the display medium layer. A plurality of gate signal lines and a plurality of source signal lines cross each other. A TFT is provided at each intersection of gate signal lines and source signal lines. Each TFT includes a gate electrode, a source electrode and a drain electrode. The TFTs respectively correspond to the plurality of pixel electrodes mentioned above. Each of the pixel electrodes corresponds to the metal layer 32 shown in FIGS. 2E and 3E. The drain electrode of each TFT is electrically connected to the respective pixel electrode. The gate electrode of each TFT is connected to the respective gate signal line, and the source electrode of each TFT is connected to the respective source signal line.

The first insulating plate 20 has a peripheral area 95 which is not covered by the second insulating plate 25. Provided on the peripheral area 95 are, for example, a gate terminal section 202 for supplying a scanning signal to the gate signal lines, a source terminal section 204 for supplying a display signal to the source signal lines, a circuit board terminal section 206, and a common transfer terminal section 208 for supplying a common signal to the counter electrode.

Figure 5:
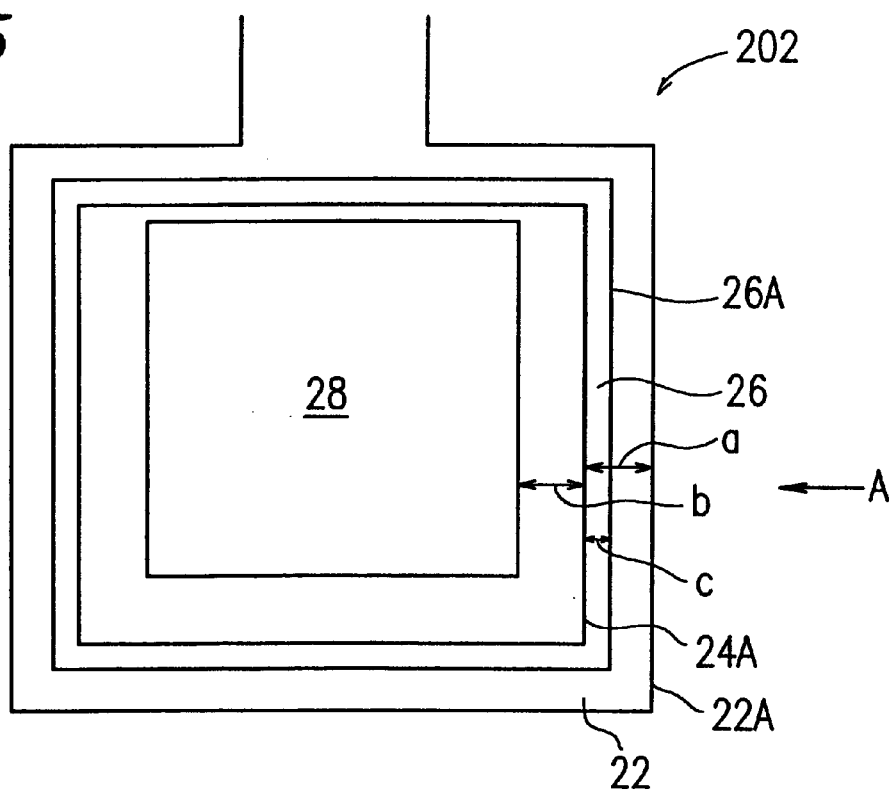
FIG. 5 is a plan view of a gate terminal section of the reflection-type LCD device shown in FIG. 4.
Figure 6:
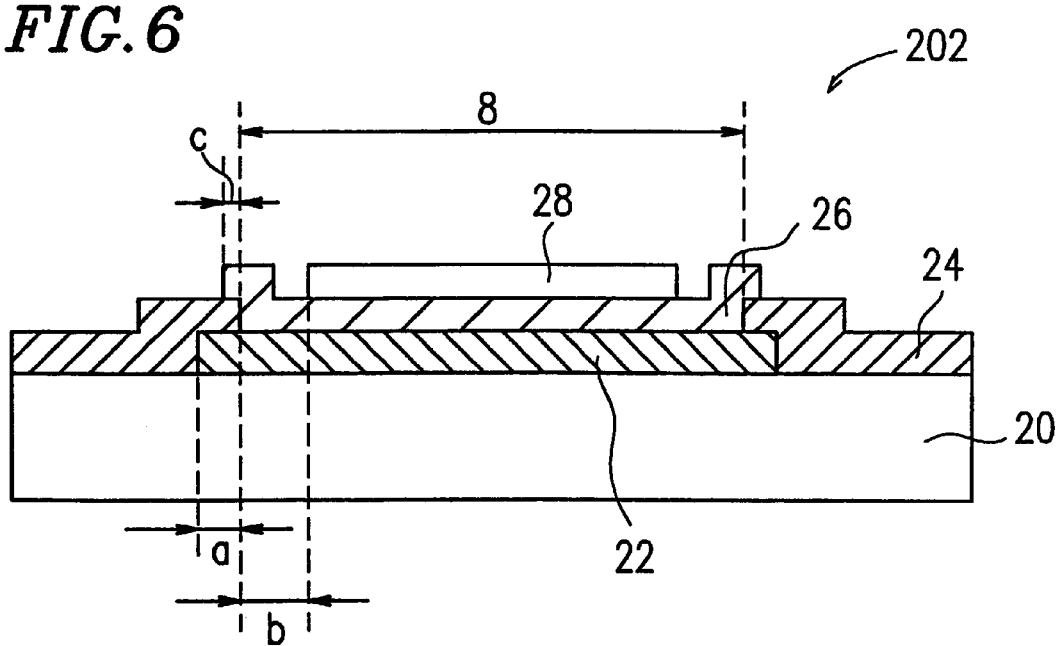
FIG. 6 is a cross-sectional view of the gate terminal section shown in FIG. 5.

FIG. 4A is a cross-sectional view of the reflection-type LCD device 100, specifically in the gate terminal section 202, the circuit board terminal section 206 and the vicinity thereof. FIG. 4B is a cross-sectional view of the reflection-type LCD device 100, specifically in the source terminal section 204, the circuit board terminal section 206 and the vicinity thereof. FIG. 5 is a plan view of the gate terminal section 202, and FIG. 6 is a cross-sectional view of the gate terminal section 202 shown in FIG. 5. FIGS. 4A and 4B are cross-sectional views seen in the direction of arrow A in FIG. 5. In FIG. 5, reference numerals 22A, 24A and 26A respectively represent edges of a first terminal electrode layer 22 continued from the gate signal lines, a gate insulating layer 24 and a second terminal electrode layer 26. Since all the conductive layers including lines are covered by the gate insulating layer 24 except for the terminal sections on the peripheral area 95 (FIGS. 4A and 4B), there is no problem of corrosion and thus the reliability of the reflection-type LCD device 100 is improved.

As shown in FIG. 4A, the gate terminal section 202 includes a first terminal electrode layer 22 formed on the first insulating plate 20, a gate insulating layer 24 provided on the first insulating plate 20 so as to cover at least the gate electrodes and the gate signal lines, a conductive layer 26 (i.e., a second terminal electrode layer) provided on the first terminal electrode layer 22 so as to cover ends of the gate insulating layer 24, and a top terminal electrode layer 28 of ITO provided on the second terminal electrode layer 26. The second terminal electrode layer 26 is formed of the same material as that of the source signal lines, and the top terminal electrode layer 28 has a flat top surface, which is exposed. The gate insulating layer 24 has openings 8. The conductive layer 26 and the top terminal electrode layer 28 are provided in each opening 8.

As described above, the first terminal electrode layer 22 is continued from the gate signal lines in the gate terminal section 202. The second terminal electrode layer 26 is formed of the same material as the source signal lines (e.g., Ti) but is formed as an island disconnected from the source signal lines.

The gate terminal section 202, the source terminal section 204 and the circuit board terminal section 206 each has a three-layer structure including the first terminal electrode layer 22, the second terminal electrode layer 26 and the top terminal electrode layer 28. The second terminal electrode layer 26 is provided for improving the electric connectability to secure the signal supply through the terminal section 202, 204, 206 compared to the structure in which the top terminal electrode layer 28 is provided directly on the first terminal electrode layer 22. However, the three-layer structure is not absolutely necessary. A two-layer structure including the top terminal electrode layer 28 and one of the first terminal electrode layer 22 and the second terminal electrode layer 26 can be used.

As shown in FIG. 4B, the source terminal section 204 has a similar structure as that of the gate terminal section 202. In this example, the first terminal electrode layer 22 acts as the source signal line in the source terminal section 204. The second terminal electrode layer 26 is electrically connected to the first terminal electrode layer 22 through the openings 8 in the gate insulating layer 24.

As shown in FIGS. 4A and 4B, the circuit board terminal section 206 has a similar structure as those of the gate terminal section 202 and the source terminal section 204. In the vicinity of the circuit board terminal section 206, the lines are formed of the first conductive layer and the first conductive layer of the circuit board terminal section 206 acts as the first terminal electrode layer 22. The second terminal electrode layer 26 is electrically connected to the first terminal electrode layer 22 through the openings 8 in the gate insulating layer 24.

As described above, the gate terminal section 202, the source terminal section 204 and the circuit board terminal section 206 have similar structures although the terminal electrode layers have different functions in accordance with the uses.

Next, a method for producing the reflection-type LCD device 100 will be described with reference to FIGS. 7A through 7F. FIGS. 7A through 7F show only the terminal section. The structure of the terminal section shown in FIGS. 7A through 7E can be common to the terminal sections 202, 204, 206 and 208. Although the following description will be made regarding an active matrix reflection-type LCD device 100, the present invention is applicable to a simple matrix reflection-type LCD device. The present invention is also applicable to a method for producing a circuit board, by which an insulating layer is formed after the top terminal electrode layer, a metal layer mainly of Al is formed on the insulating layer, and then the insulating layer and the metal layer are partially removed so as to expose at least a part of the top terminal electrode layer.

Figure 7A:
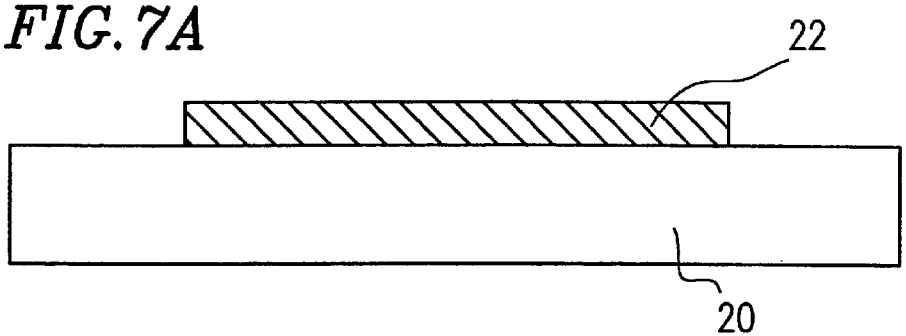
FIGS. 7A through 7F are cross-sectional views illustrating a method for producing the reflection-type LCD device shown in the first example.

First, as shown in FIG. 7A, a first conductive layer formed of, for example, Ta (thickness: about 300 nm) is formed on the first insulating plate 20 by sputtering and patterned by photolithography, thereby forming the first terminal electrode layer 22 as well as a gate signal line and a gate electrode connected thereto (not shown).

Figure 7B:
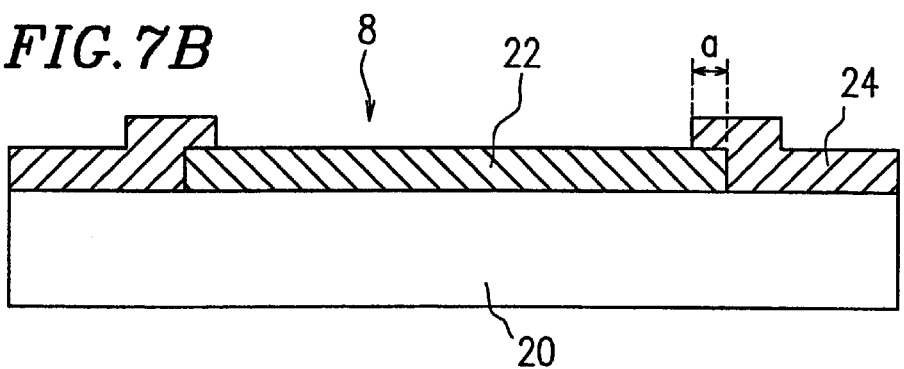

Then, as shown in FIG. 7B, an insulating layer formed of, for example, silicon nitride is formed on the first insulating plate 20 so as to cover the gate signal lines, gate electrodes and the first terminal electrode layer 22 by plasma CVD and patterned by dry etching, thereby forming the gate insulating layer 24. The gate insulating layer 24 is further patterned to form an opening 8. The opening 8 is formed so that the inner periphery of the gate insulating layer 24 is inside the outer end of the first terminal electrode layer 22 and that the gate insulating layer 24 overlaps the ends of the first terminal electrode layer 22 by distance a=about 5 $\mu$m (FIGS. 5 and 7B). Unless the gate insulating layer 24 overlaps the ends of the first terminal electrode layer 22, the surface of the first insulating plate 20 is partially exposed depending on the patterning precision and thus the exposed surface of the first insulating plate 20 is etched by dry etching performed for patterning the gate insulating layer 24. Currently, it is designed so that overlapping distance a is about 5 $\mu$m in consideration of the patterning precision and the etching precision. Distance a is preferably about 5 $\mu$m or less and more than 0.

Although not shown, a semiconductor layer formed of amorphous silicon and a contact layer formed of n$^+$ amorphous silicon are formed by plasma CVD and patterned to form a TFT in the display area (not shown).

Figure 7C:
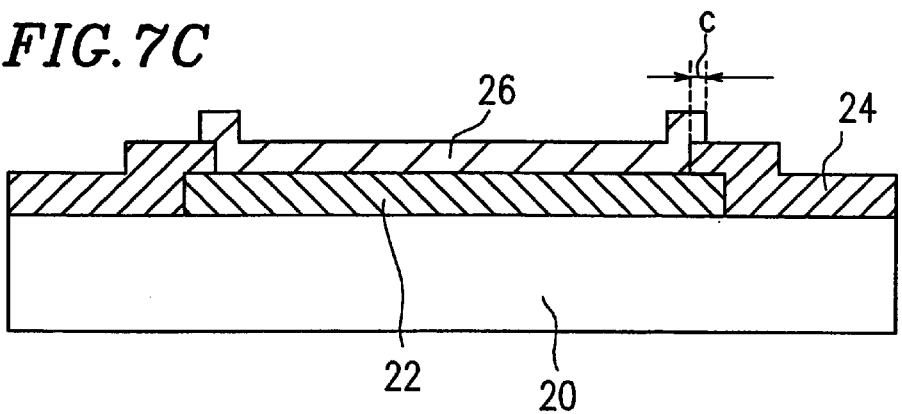

As shown in FIG. 7C, a second conductive layer formed of, for example, Ti (thickness: about 300 nm) is formed by sputtering on the first terminal electrode layer 22 in the opening 8 so as to overlap the gate insulating layer 24. The second conductive layer is patterned, thereby forming the second terminal electrode layer 26 as well as the source signal lines and the source electrodes (not shown). As described above, the second terminal electrode layer 26 is extended to outside the opening 8 so as to overlap the gate insulating layer 24, in order to maximize the contact area of the first terminal electrode layer 22 and the second terminal electrode layer 26. When the contact area of the first and second terminal electrode layers 22 and 26 is maximized, the area of the top terminal electrode layer 28 is enlarged, and the contact state of these conductive layers is improved. Currently, it is designed so that overlapping distance c is about 3 $\mu$m in consideration of the patterning precision and the etching precision. Distance c is preferably about 3 $\mu$m or less and more than 0.

Although not shown, the contact layer of the channel region of the TFT is removed, thereby forming the TFT.

Figure 7D:
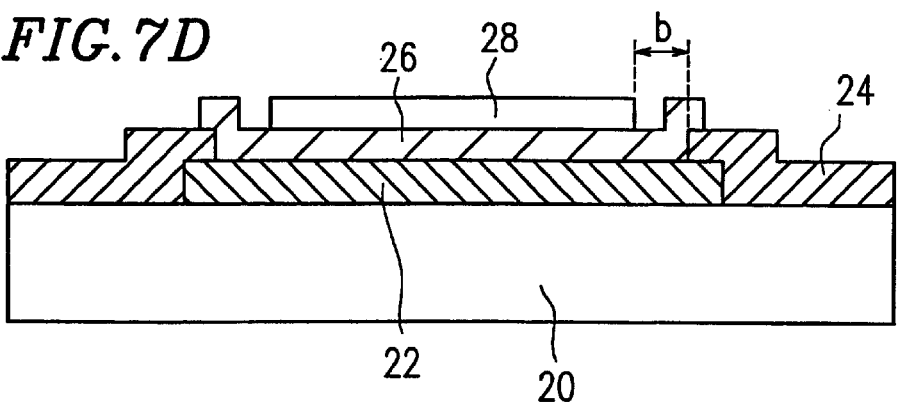

As shown in FIG. 7D, an ITO layer is formed on the second terminal electrode layer 26 by sputtering. The ITO layer is patterned to form the top terminal electrode layer 28 having the outer periphery inside the inner periphery of the second terminal electrode layer 26 and also inside the inner periphery of the gate insulating layer 24. Thus, the top terminal electrode layer 28, which is formed on a flat surface, has a flat top surface. In order to maximize the area of the top terminal electrode layer 28 while preventing formation of steps, distance b between the inner periphery of the gate insulating layer 24 and the outer periphery of the top terminal electrode layer 28 is designed to be about 2 $\mu$m currently. Distance b is preferably about 2 $\mu$m or less and more than 0. As shown in FIGS. 4A and 4B, the top terminal electrode layer 28 is formed in a similar manner in the circuit board terminal section 206.

Figure 7E:
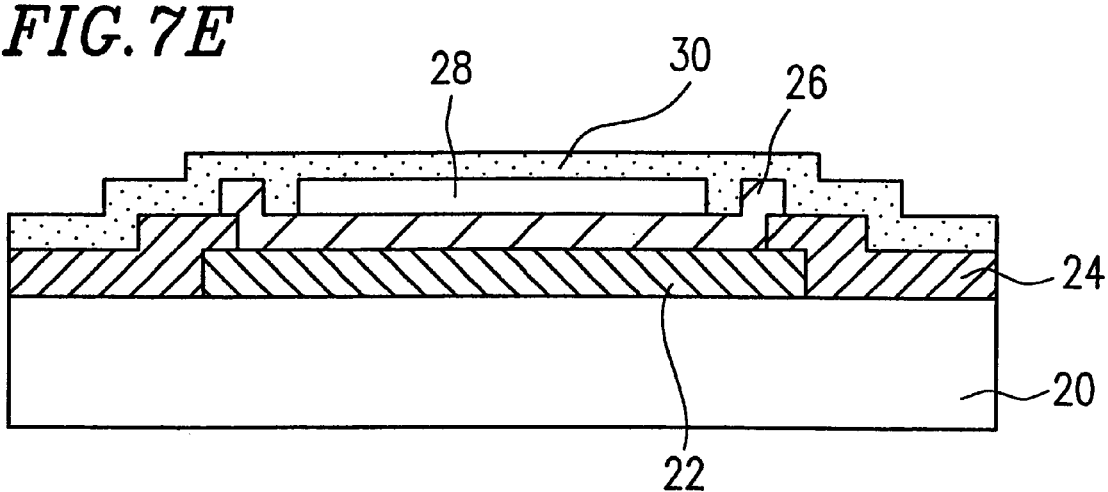

As shown in FIG. 7E, a first protective layer 30 formed of, for example, an acrylic photosensitive resin is formed on the gate insulating layer 24 so as to cover the second terminal electrode layer 26 and the top terminal electrode layer 28. The first protective layer 30 contacts the top terminal electrode layer 28 along the flat top surface thereof. The first protective layer 30 is formed to have protrusions and depressions so as to act as an underlying layer for forming the reflective sections having a surface having protrusions and depressions in order to optimize the reflection characteristics of the surface of the reflective sections in the display area.

Alternatively, the first protective layer 30 can be formed of a metal such as, for example, molybdenum (Mo) or Ti. In the case where the first protective layer 30 is formed of such a metal, the first protection layer 30 can be patterned together with the metal layer 32 of mainly Al formed thereon by adjusting the etching conditions. Accordingly, the separate step of removing the first protective layer 30 is eliminated, thus simplifying the production method.

Figure 7F:
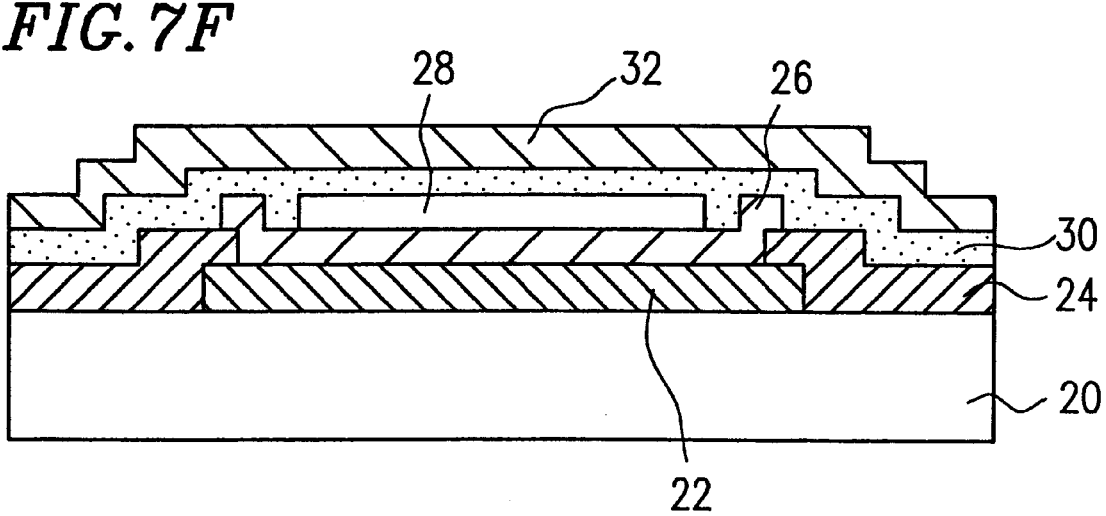

As shown in FIG. 7F, the metal layer 32 of mainly Al is formed so as to cover the first protective layer 30 by sputtering. The metal layer 32 can be formed of pure Al or an alloy containing Al, such as, for example, an Al-W alloy.

Then, the metal layer 32 and the first protective layer 30 are partially removed, thereby forming the reflective sections (or reflective pixel electrodes) in the display area and exposing the flat surface of the top terminal electrode layer 28 in the gate terminal section 202 (FIG. 6) as well as other terminal sections.

In this example, the gate insulating layer 24 acting as an interlayer insulating layer is formed of a positive photosensitive resin (OFPR-800, Tokyo Ohka Kogyo Kabushiki Kaisha). As a developer, TMAH (tetramethyl ammonium hydroxide, Tokyo Ohka Kogyo Kabushiki Kaisha) is used. TMAH is also used as a resist developer for patterning the metal layer 32. As an etchant, a mixed solution of nitric acid, acetic acid and phosphoric acid is used.

Figure 12A:
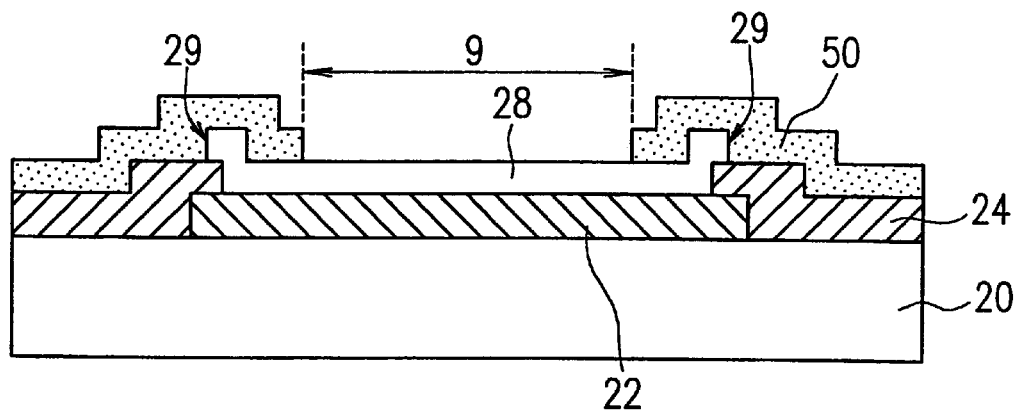
FIGS. 12A through 12F are cross-sectional view of terminal sections having alternative structures according to the present invention.

As shown in FIG. 7D, the top terminal electrode layer 28 is a flat layer. The present invention is not limited to such a structure. For example, the top terminal electrode layer 28 formed by patterning an ITO layer can have a stepped portion in a peripheral portion thereof. For example, the peripheral portion of the top terminal electrode layer 28 can overlap the projecting peripheral portion of the second terminal electrode layer 26 formed of Ti (FIG. 7D, surrounding the recessed portion formed by the opening of the gate insulating layer 24). In this case, it is preferable, as shown in FIG. 12A, to form a second protective layer 50 for covering the stepped portion of the top terminal electrode layer 28 and exposing only the flat area of the stop surface thereof before forming the first protective layer 30.

In the display area, the first protective layer 30 is used for forming protrusions and depressions in the reflective sections in order to optimize the reflection characteristics of the surface of the reflective sections as described above. The first protective layer 30 can be used for another purpose. For example, the first protective layer 30 can be provided over the TFT, the source signal line and the gate signal line for connecting the pixel electrode formed above the first protective layer 30 to the drain electrode of the TFT formed below first protective layer 30 through the through-holes formed therein.

A reflection-type LCD device 100 is formed by combining the active matrix plate 20 having the above-described elements thereon and the counter plate 25 (FIG. 1) having the counter electrode (not shown), injecting a display medium (i.e., a liquid crystal material) into the gap between the plates 20 and 25, and attaching the driving ICs and the driving circuit board 21 to the terminal sections 202, 204, 206 and the like as shown in FIGS. 4A and 4B through the ACF 80. In the case where the reflection-type LCD device 100 is for color display, the counter plate 25 is combined in the state of having a color filter as well as the counter electrode thereon.

In the reflection-type LCD device 100 in this example, at least in one of the terminal section, for example, the gate terminal section 202, the top terminal electrode layer 28 formed of ITO is formed on a flat top surface of the second terminal electrode layer 26 as shown in FIG. 7D. Accordingly, the top terminal electrode layer 28 obtains a flat top surface. As shown in FIG. 7E, the fist protective layer 30 is provided so as to completely cover the top terminal electrode layer 28. Due to such a structure, the top terminal electrode layer 28 is not in direct contact with the metal layer 32 provided on the first protective layer 30. Accordingly, during partial removal of the first protective layer 30 and the metal layer 32, electrolytic corrosion of the top terminal electrode layer 28 does not occur, thus preventing the removal of the top terminal electrode layer 28.

EXAMPLE 2

A second example relates to a common transfer terminal section 208 of a reflection-type LCD device to which the present invention is applied. The reflection-type LCD device in the second example substantially has the same structure as that of the first example. Elements which are identical with those described with reference to FIGS. 1 through 7F bear identical reference numerals and detailed descriptions thereof will be omitted.

Figure 9:
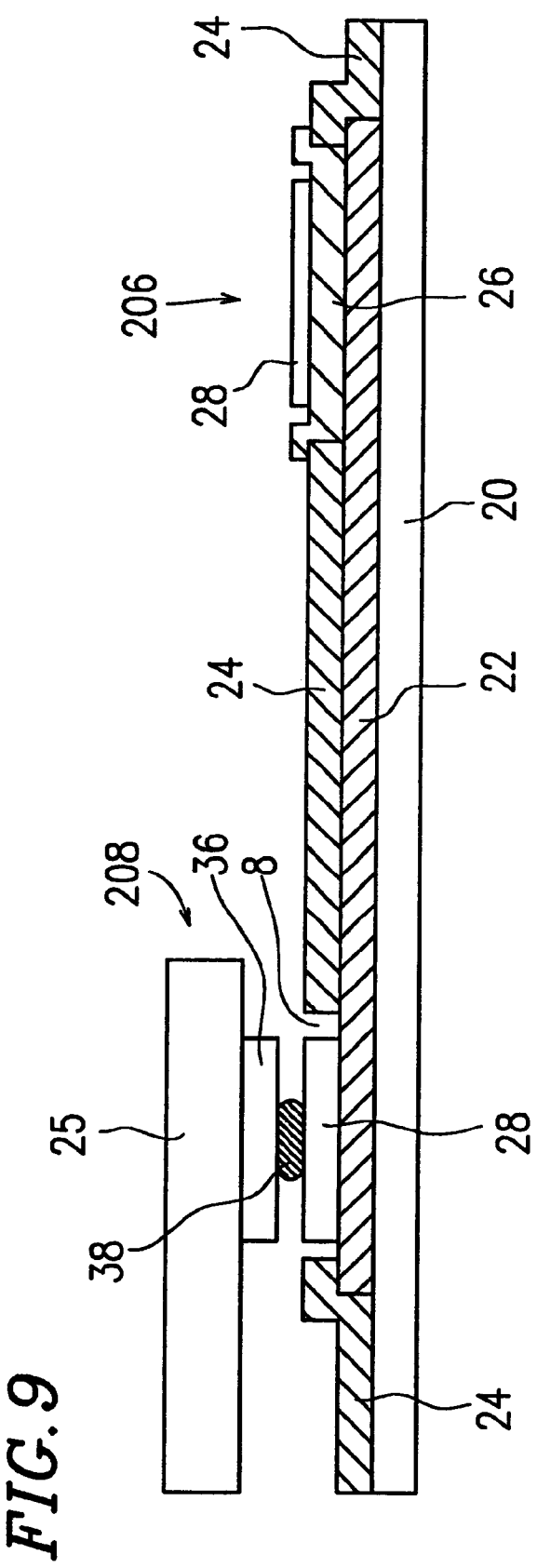
FIG. 9 is a cross-sectional view of a reflection-type LCD device in a second example according to the present invention.
Figure 10:
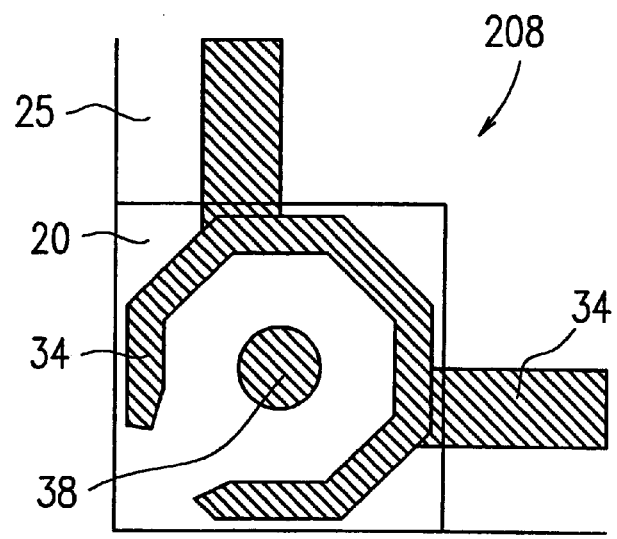
FIG. 10 is a plan view of a common transfer terminal section shown in FIG. 9.
Figure 11:
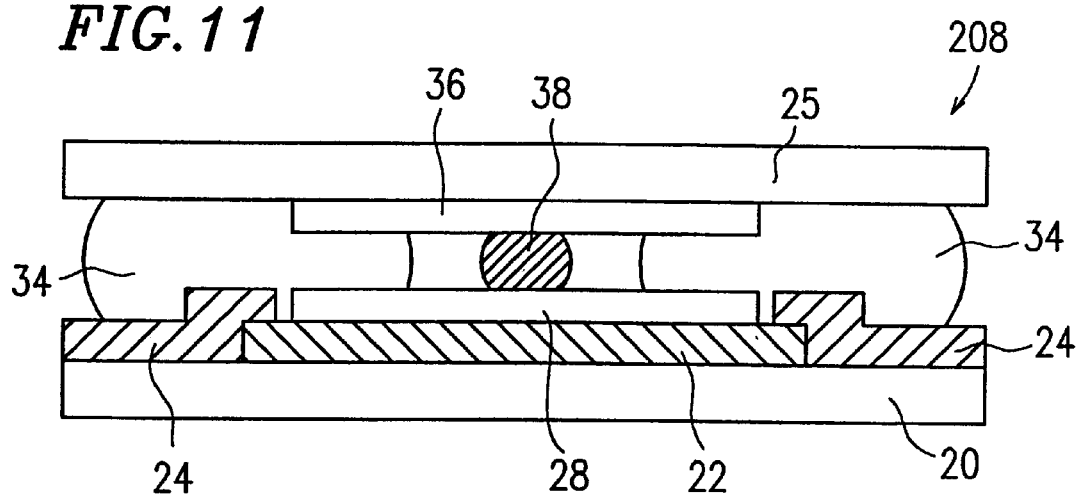
FIG. 11 is a cross-sectional view of the common transfer terminal section shown in FIG. 10.

FIG. 9 is a cross-sectional view of the common transfer terminal section 208, the circuit board terminal section 206 and the vicinity of the reflection-type LCD device. FIG. 10 is a plan view of the common transfer terminal section 208, and FIG. 11 is a cross-sectional view of the common transfer terminal section 208 shown in FIG. 10. The common transfer terminal section 208 connects lines on the active matrix plate 20 to a counter electrode 36 on the counter plate 25.

As shown in FIG. 9, the circuit board terminal section 206 includes the first terminal electrode layer 22, the second terminal electrode layer 26 and the top terminal electrode layer 28 sequentially provided from the bottom. The common transfer terminal section 208 excludes the second terminal electrode layer 26.

Figure 8:
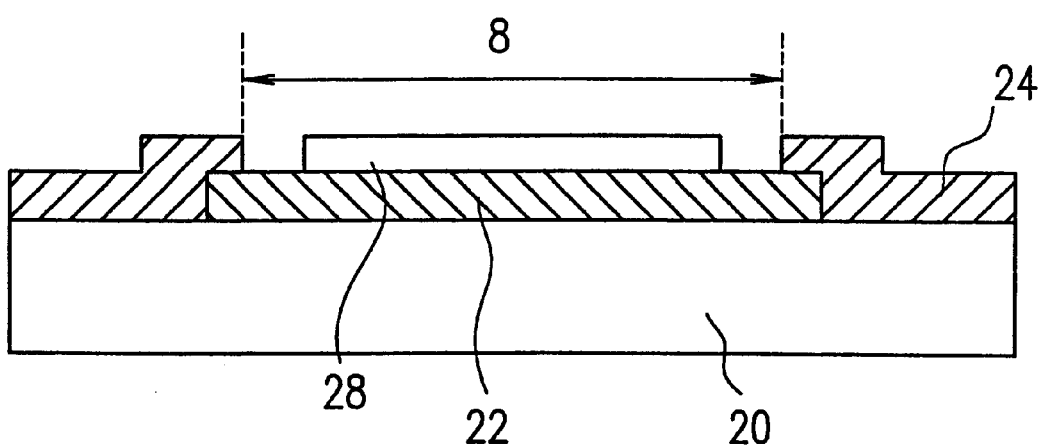
FIG. 8 is a cross-sectional view of a terminal section having an alternative structure according to the present invention.

The common transfer terminal section 208 includes the first terminal electrode layer 22, the gate insulating layer 24 provided on the first insulating plate 20 so as to cover at least the first terminal electrode layer 22 as well as the gate electrodes and the gate signal lines (not shown) and a top terminal electrode layer 28 provided on the first terminal electrode layer 22. The gate insulating layer 24 has an opening 8, in which the top terminal electrode layer 28 is provided. It is not necessary for the gate insulating layer 24 to have the opening 8 in the common transfer terminal section 208, but it is sufficient that the gate insulating layer 24 has an opening in at least one of the terminal sections 202, 204, 206 and 208. For example, the gate electrode 202 can exclude the second terminal electrode layer 26 as shown in FIG. 8. Alternatively, the common transfer terminal section 208 can have the second terminal electrode layer 26 so as to have a three-layer structure including the first terminal electrode layer 22 of Ta, the second terminal electrode layer 26 of Ti and the top terminal electrode layer 28 of ITO as shown in FIG. 6.

The common transfer terminal section 208 can be provided at one or more of the four corners of the display area 11 (FIG. 1) or along at least one of the four sides.

As best shown in FIG. 11, the top terminal electrode layer 28 and the counter electrode 36 are electrically connected to each other through a conductive paste 38.

In this example also, the top terminal electrode layer 28 is not in direct contact with a metal layer 32 provided above the terminal electrode layer 28. Accordingly, during partial removal of a first protective layer 30 and the metal layer 32, electrolytic corrosion of the top terminal electrode layer 28 does not occur, thus preventing the top terminal electrode layer 28. Such a structure realizes effective production of the reflection-type LCD devices at a high yield.

In the examples described above, the present invention is applied to the terminal sections for connecting lines and the like. The present invention is also applicable to an examination terminal section for examining whether various elements provided inside and outside the display area is normally operated or not. Such an examination terminal section includes a top layer formed of ITO.

The present invention is applicable to reflection-type LCD devices of various structures as well as the reflection-type LCD devices described in the above examples.
(Modifications)

FIGS. 12A through 12F shows various reflection-type LCD devices having an opening 9 in the gate insulating layer 24. FIG. 13A through 13E shows various reflection-type LCD devices having no opening in the gate insulating layer 24. In the reflection-type LCD devices shown in 13A through 13E, a through-hole is formed in the gate insulating layer 24 in an area other than the terminal sections to electrically connect the first terminal electrode layer 22 and the top terminal electrode layer 28 as shown in FIG. 2G. Various structures of various elements such as, elements included in the display area (e.g., TFTs, lines, and pixel electrodes) as well as the terminal sections, materials thereof, production methods thereof (including different orders of steps) can be combined in an appropriate manner to obtain effects.

Figure 12B:
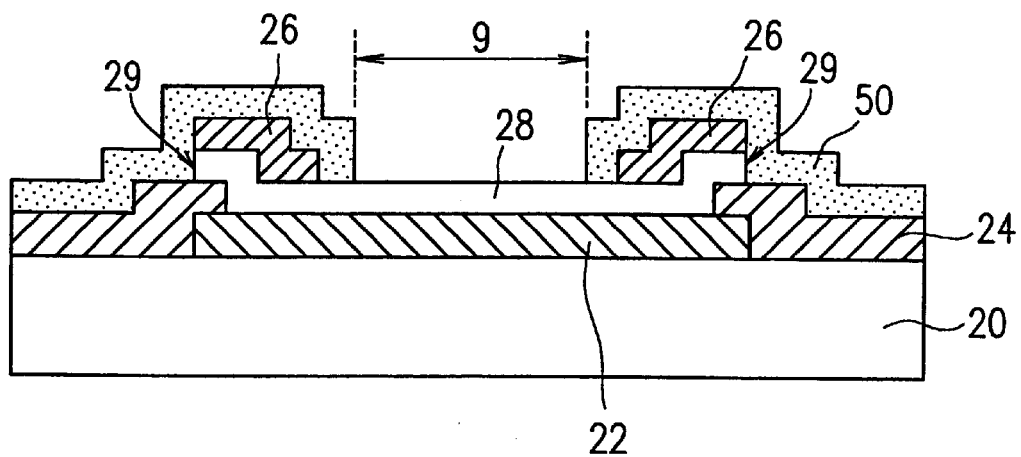

The reflection-type LCD devices shown in FIGS. 12A through 12D, 12F, 13B, 13D and 13E each include a second protective layer 50 formed of, for example, silicon nitride. In FIG. 12A and 12B, the top terminal electrode layer 28 formed of ITO has a stepped peripheral portion 29, and thus the second protective layer 50 is provided in order to cover the stepped peripheral portion 29 and expose only the flat surface of the top terminal electrode layer 28. In the case where the second terminal electrode layer 26 is provided to form signal lines, the second protective layer 50 is preferably provided for protecting the signal lines against various processing performed after the formation of the signal lines and against the environment to which the final product will be exposed so as to, for example, improve the reliability against corrosion. The second protective layer 50 is not necessary when not required in the processing after the formation of the signal lines (e.g., in terms of generation of additional resistance or formation of other layers). In the case where an insulating layer is provided to cover the second terminal electrode layer 26 forming the signal lines (for example, two-layer structure of a metal layer and a metal oxide layer), the second protective layer 50 can be formed of a resin.

As can be appreciated from the above description, even when the top terminal electrode layer 28 has a stepped peripheral portion 29, only a flat area of the top surface of the top terminal electrode layer 28 is in contact with the first protective layer (not shown) by covering the stepped peripheral portion 29 by the second protective layer 50. As a result, the top surface of the top terminal electrode layer 28 is completely covered by the first protective layer and thus the electrolytic corrosion of the top terminal electrode layer 28 is avoided.

Figure 12C:
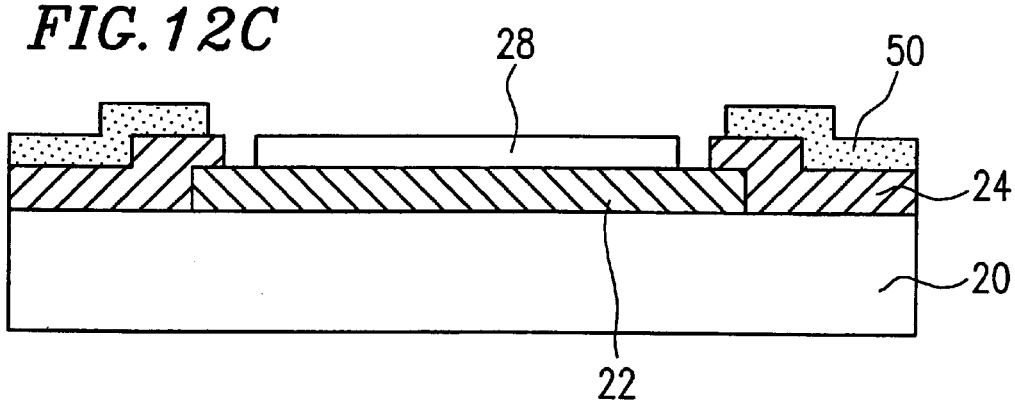
Figure 12D:
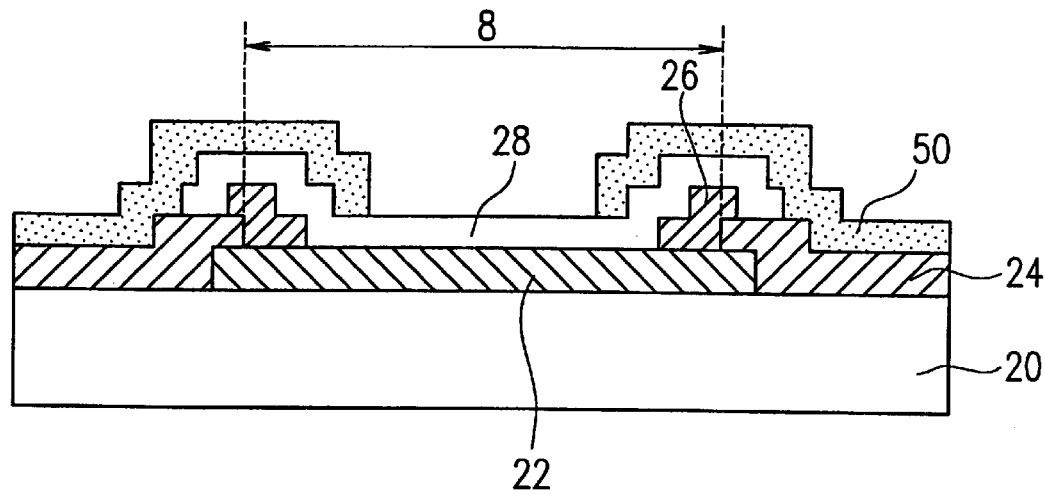
Figure 12E:
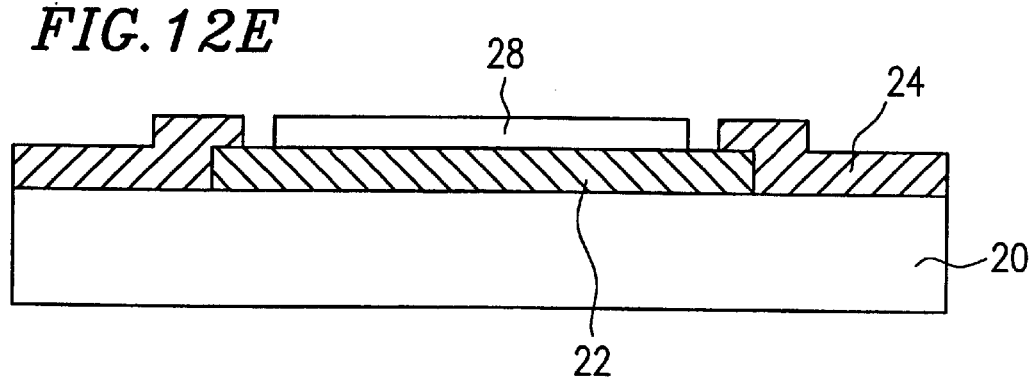
Figure 12F:
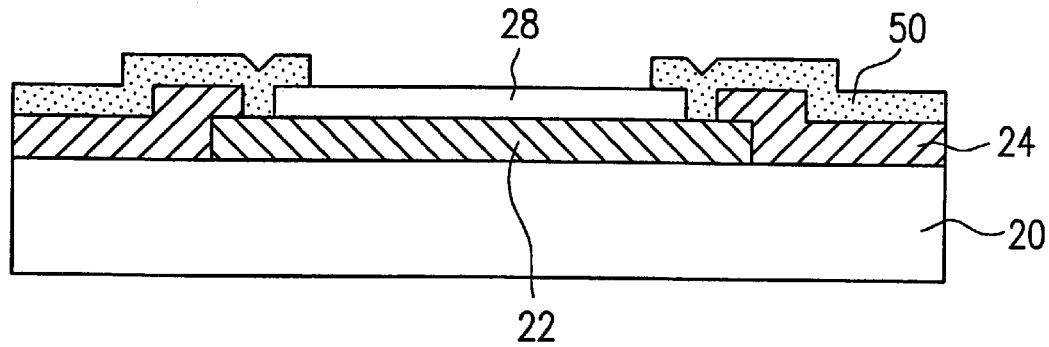
Figure 13A:
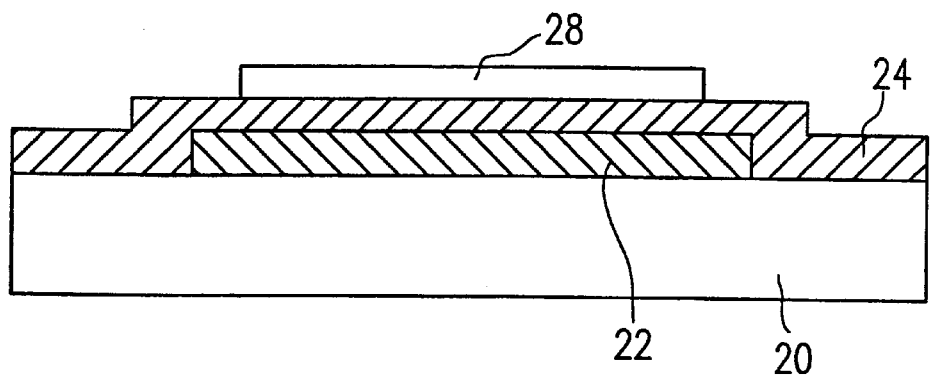
FIGS. 13A through 13E are cross-sectional view of terminal sections having alternative structures according to the present invention.
Figure 13B:
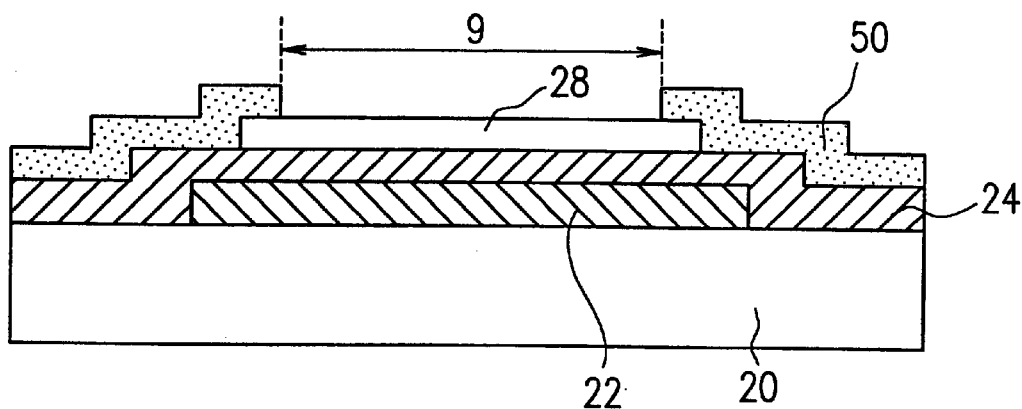
Figure 13C:
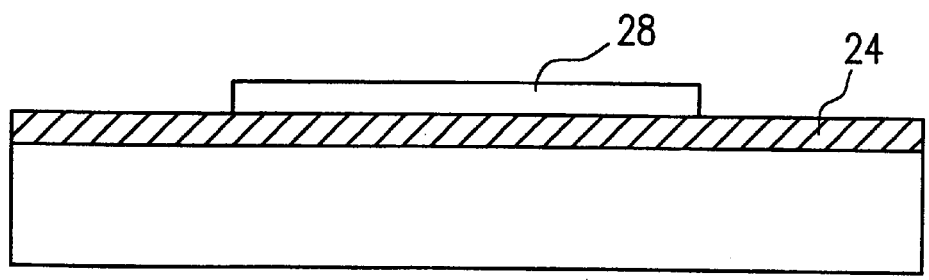
Figure 13D:
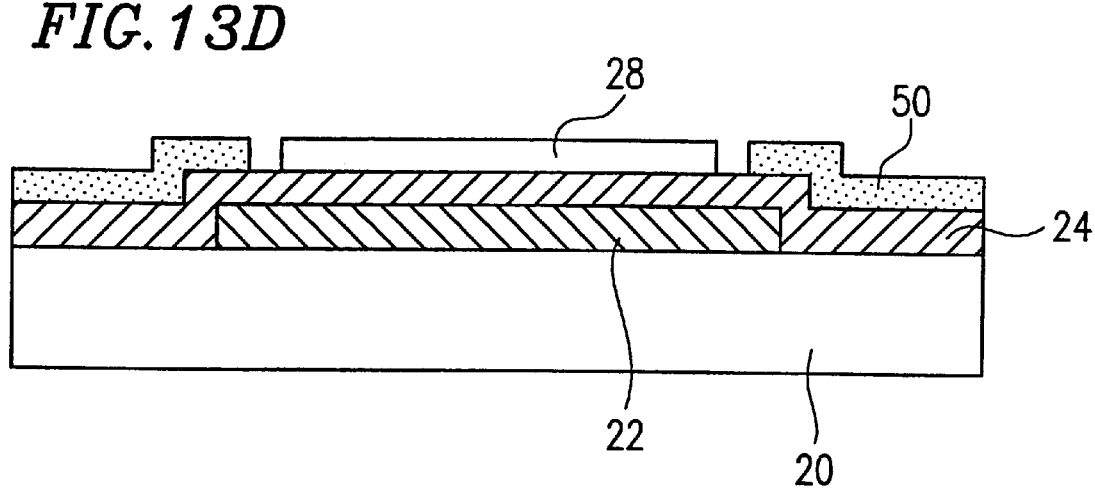
Figure 13E:
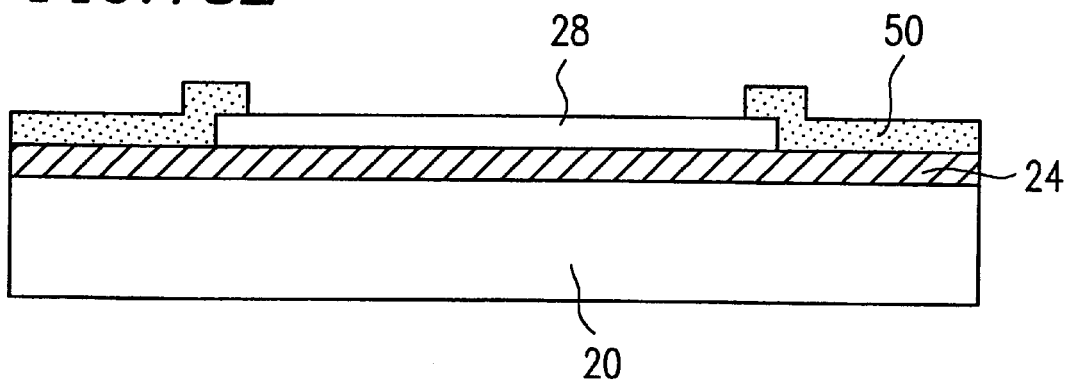
Figure 14A:
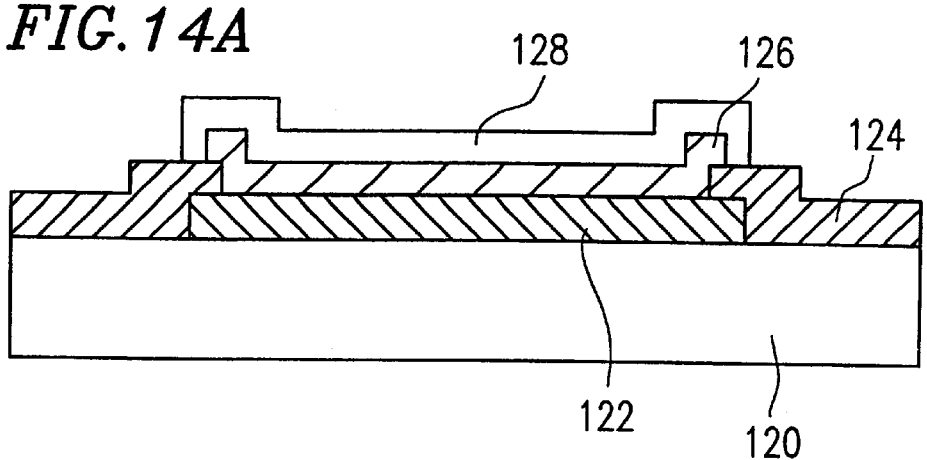
FIGS. 14A through 14C are cross-sectional view illustrating a method for producing a conventional reflection-type LCD device.
Figure 14B:
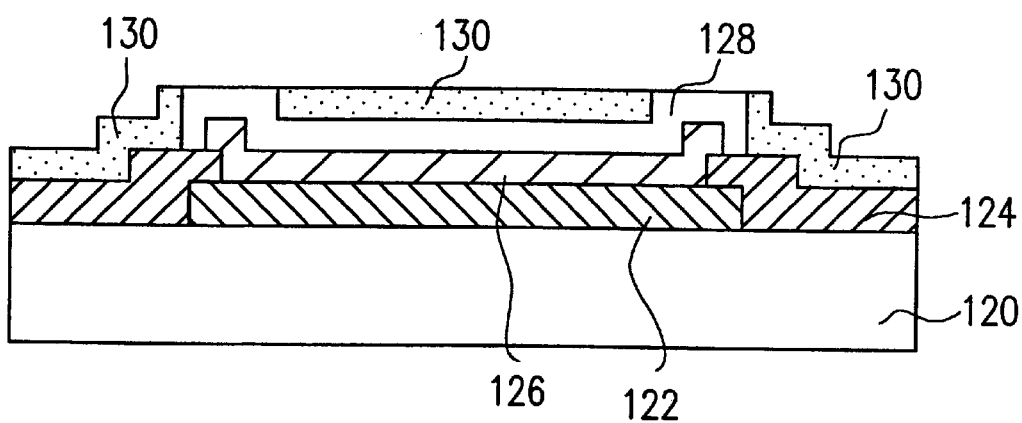
Figure 14C:
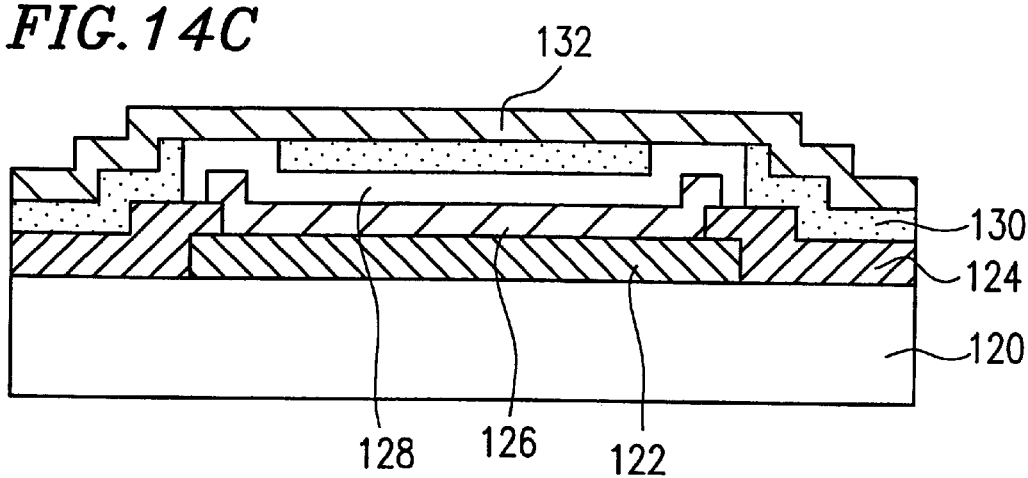

In FIGS. 12C and 13D, the second protective layer 50 is provided on the gate insulating layer 24. In FIGS. 12A, 12B, 12D, 12F, 13B and 13E, the second protective layer 50 is provided so as to cover the gate insulating layer 24 and a part of the top terminal electrode layer 28. In FIGS. 12C, 12E, and 13A through 13E, the top terminal electrode layer 28 is a flat layer.

FIG. 12B shows, for example, a source terminal section. The first terminal electrode layer 22 is formed together with the gate signal lines and shields ICs connected in the source terminal section against light. In the case where the source terminal section includes a structure of ITO/Ta/TaN, the second terminal electrode layer 26 of Ta/TaN is removed so as to expose the flat surface of the top terminal electrode layer 28 of ITO in the opening 9. The Ta/TaN layer 26 is left on the periphery of the top terminal electrode layer 28 surrounding the opening 9 so as to improve the electrical connection of the source signal lines and the source terminal section.

In FIG. 12D, for example, the second terminal electrode layer 26 is formed of Ti and provided between the top terminal electrode layer 28 of ITO and the first terminal electrode layer 22 of Ta. Thus, the electrical connection of the top terminal electrode layer 28 and the first terminal electrode layer 22 is stabilized. Since the second terminal electrode layer 26 is etched by an etchant used for patterning the second protective layer 50, the second terminal electrode layer 26 is provided avoiding the opening 8 of the gate insulating layer 24.

In the first and second examples, the source signal lines are formed of Ti and the gate signal lines are formed of Ta. The source signal lines can be formed of TaN/Ta/TaN or ITO. The gate signal lines can be formed of Ta/TaN, ITO or Ti. These materials can be used in any combination.

The present invention is not limited to the three-layer structure as shown in FIGS. 6, 12B and 12D, but is applicable to a one-layer structure (FIGS. 13C and 13E), a two-layer structure (FIGS. 12A, 12C, 12E, 12F, 13A, 13B and 13D), or a structure having four layers or more.

The terminal sections according to the present invention is applicable to a reflection and transmission LCD device having a reflective area and a transmission area in each pixel area. In such an LCD device, an area for performing display using transmitted light is referred to as a "transmission area" and an area for performing display using reflected light is referred to as a "reflection area". The transmission area includes a liquid crystal layer area interposed between a pair of base plates and a transmission electrode area provided on one of the base plates. The reflection area includes a liquid crystal layer area interposed between the pair of base plates and a reflection electrode area provided on one of the base plates. The transmission electrode area and the reflection electrode area respectively define a two-dimensional area of the transmission area and the reflection area. The transparent electrode area is typically defined by the transparent electrode. The reflection electrode area is defined by a reflection electrode or a combination of a transparent electrode and a reflection electrode.

Figure 15A:
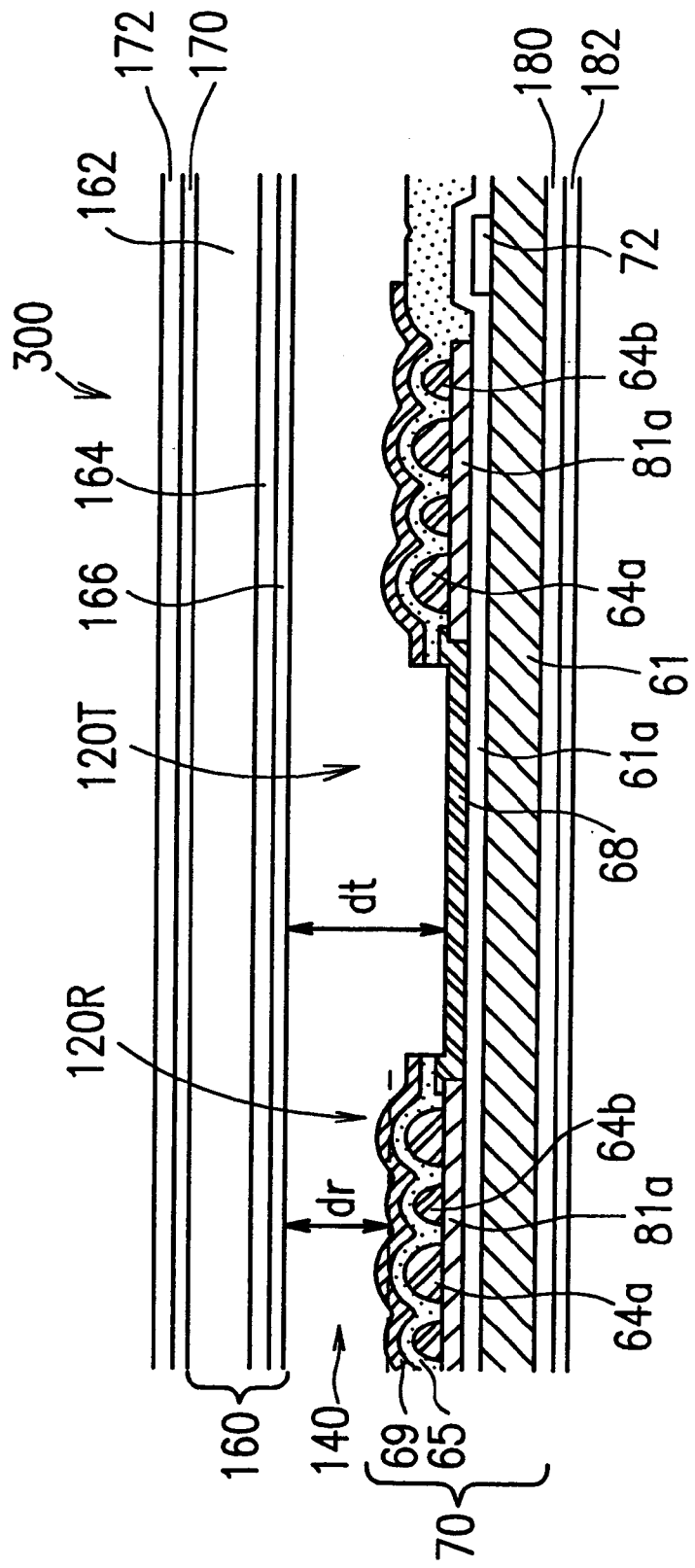
FIG. 15A is a cross-sectional view of a reflection and transmission LCD device to which the present invention is applicable.
Figure 15B:
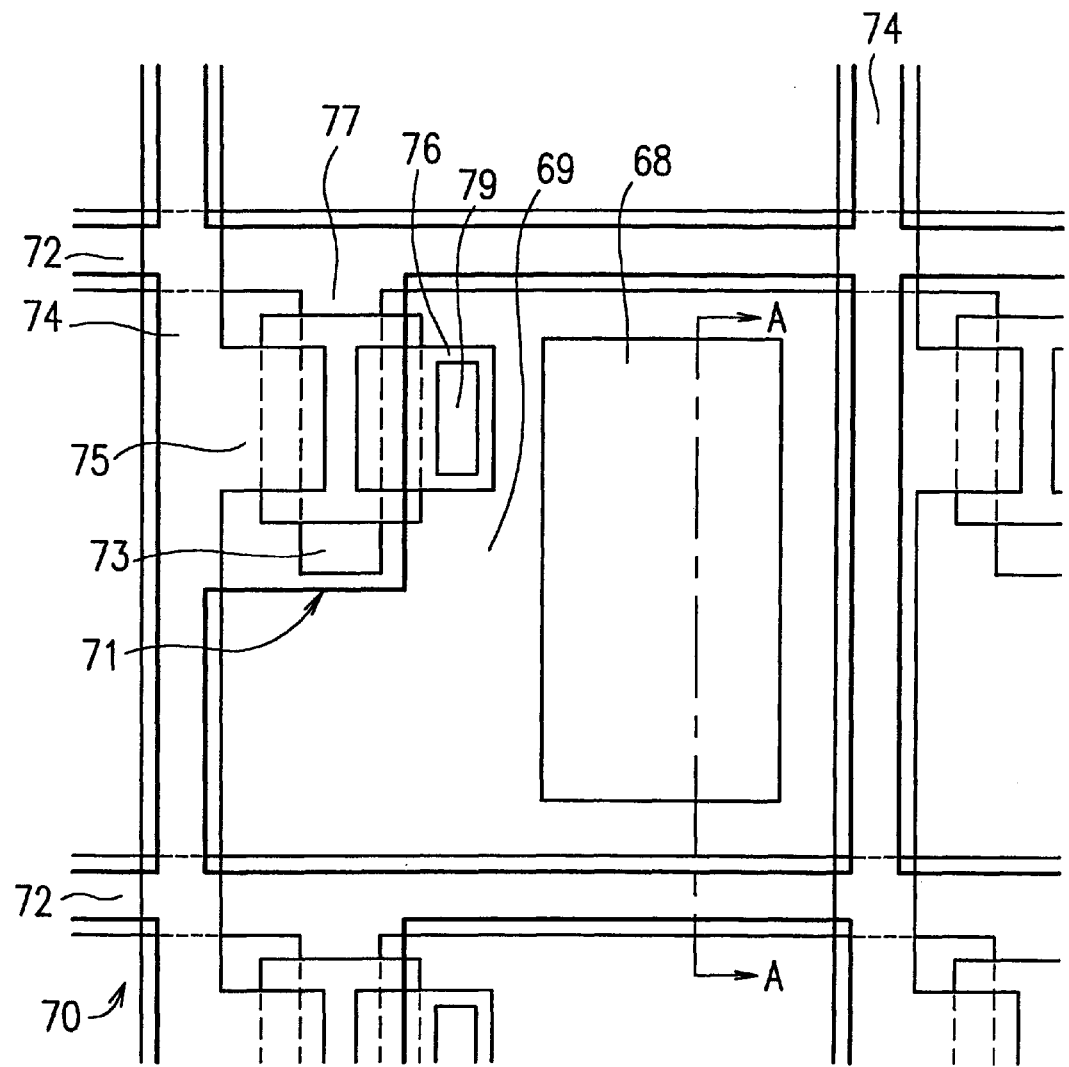
FIG. 15B is a plan view of the reflection and transmission LCD device shown in FIG. 15A.

FIG. 15A is a partial cross-sectional view of an exemplary reflection and transmission LCD device 300. FIG. 15B is a plan view of an active matrix substrate 70 of the reflection and transmission LCD device 300. FIG. 15A is along line A–A' in FIG. 15B.

As shown in FIG. 15A, the reflection and transmission LCD device 300 includes the active matrix substrate 70, a counter substrate 160, and a liquid crystal layer 140 interposed between the substrates 70 and 160. The reflection and transmission LCD device 300 further includes differential phase compensation elements (e.g., a phase plate, a phase film or a laminate including the phase plate, the phase film and the like) 180 and 170 respectively provided on surfaces of the active matrix substrate 70 and the counter substrate 160 not in contact with the liquid crystal layer 140. The reflection and transmission LCD device 300 further includes polarizing elements 182 and 172 outside the differential phase compensation elements 180 and 170.

As shown in FIGS. 15A and 15B, the active matrix substrate 70 includes a glass plate 61, and a plurality of gate bus lines 72 as scanning lines and a plurality of source bus lines 74 as signal lines provided on the glass plate 61. The gate bus lines 72 and the source bus lines 74 cross each other. In each of rectangular areas formed by the intersection of two adjacent gate bus lines 72 with two adjacent source bus lines 74, a reflection electrode 69 formed of a material having a high light reflectance (e.g., Al, Ag or Ta) and a transparent electrode 68 formed of a high light transmittance (e.g., ITO) are both provided. A pixel electrode includes the reflection electrode 69 and the transparent electrode 68. Provided below the reflection electrode 69 are high insulating layers 64a, low insulating layers 64b and a polymer resin layer 65 provided on the high and low insulating layers 64a and 64b. Accordingly, the surface of the reflection electrode 69 has a continuously corrugating top surface. The insulating layers can have an equal height. The polymer resin 65 can be eliminated. It can be structured that only the insulating layers 64a and 64b form an interlayer insulating layer having a continuously corrugating top surface.

The reflection electrode 69 is connected to a drain electrode 76 of a TFT 71 through a through-hole 79. The TFT 71 includes a semiconductor layer 77 provided on a gate insulating layer 61a which covers a gate electrode 73. The gate electrode 73 and a source electrode 75 of the TFT 71 are respectively branched from each gate bus line 72 and each source bus line 74.

As shown in FIG. 15A, the counter substrate 160 includes a glass plate 162, a color filter layer 164 and a transparent electrode 166 formed of ITO.

Horizontal alignment layers (not shown) are provided between the liquid crystal layer 140 and the active matrix substrate 70 and between the liquid crystal layer 140 and the counter substrate 160. The alignment layers are treated by rubbing or the like so as to provide a preferable twist angle of liquid crystal molecules. The liquid crystal layer 140 is formed of a nematic liquid crystal material having a positive dielectric anisotropy. The liquid crystal molecules in the liquid crystal layer 140 are given a tilt angle of about 0.1 to 5 degrees with respect to the surfaces of the glass plates 61 and 162 as a result of rubbing of the horizontal alignment layers. The liquid crystal molecules are parallel to the glass plates 61 and 162 when no voltage is applied and tilt toward the normal direction to the glass plates 61 and 162 when a voltage is applied.

A pixel area, which is a minimum unit for display of the reflection and transmission LCD device 300, includes a reflection area 120R defined by the reflection electrode 69 and a transmission area 120T defined by the transparent electrode 68. The thickness of the liquid crystal layer 140 is set to be dr in the reflection area 120R and dt in the transmission area 120T (dt>dr) in order to substantially equalize the optical path length of the light reflected by the reflection area 120R and the light transmitted through the transmission area 120T, both contributing display. It is preferable that dt=2dr, but the dt and dr can be appropriately set in accordance with the display characteristics. It is sufficient that at least dt>dr. Typically, dt is about 4 to 6 $\mu$m and dr is about 2 to 3 $\mu$m. In other words, a step of about 2 to 3 $\mu$m is formed in the pixel area of the active matrix substrate 70. When the reflection electrode 69 has an uneven surface as shown in FIG. 15A, dr is the average thickness of the liquid crystal layer 140. As described above, the reflection and transmission LCD device 300 has the liquid crystal layer 140 having non-uniform thickness (i.e., including a reflection area 120R and a transmission area 120T).

When the present invention is applied to formation of a terminal section of the reflection and transmission LCD device 300, the following effect is provided. When a metal layer formed of, for example, Al for forming a reflective electrode and a first protective layer formed of, for example, the polymer resin layer (corresponding to the polymer resin layer 65 in FIG. 15A) for forming the surface of the reflection electrode to have protrusions and depressions are at least partially removed, the metal layer is prevented from contacting an ITO layer for forming the transparent electrode. Accordingly, removal of the ITO layer due to electrolytic corrosion is avoided. Thus, efficient production of reflection and transmission LCD devices 300 at a high yield is realized.

According to the present invention, as described above, direct contact of a metal layer and a top terminal electrode layer formed of ITO is prevented when the metal layer and a first protective layer are at least partially removed in at least one terminal section of a peripheral area of an LCD device. Due to such a structure, removal of the top terminal electrode layer due to electrolytic corrosion is prevented, resulting in a high yield production of a terminal section including a top terminal electrode layer formed of ITO. Thus, according to the present invention, a reflection-type LCD device produced at a high yield and a method for producing the same, and a method for producing a circuit board used for the reflection-type liquid crystal display device are provided. The present invention is applicable to any circuit board including a top layer formed of ITO, only a flat area of a top surface of which is exposed.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A method for producing a reflection-type liquid crystal display device, including a first substrate; a second substrate; and a display medium layer interposed between the first substrate and the second substrate, wherein the first substrate includes a first electrode for applying a voltage to the display medium layer; the second substrate includes a second electrode for applying a voltage to the display medium layer; the first substrate includes a light reflective section in the vicinity of the display medium layer for reflecting light which is incident on the reflection-type liquid crystal display device through the second substrate, and includes a plurality of terminal sections for supplying a voltage to the first electrode and the second electrode; and at least one of the plurality of terminal sections has a top layer formed of ITO, only a flat area of a top surface of the top layer being exposed, the method comprising the steps of:

forming an ITO layer in the first substrate;
patterning the ITO layer to form the top layer in the at least one of the terminal sections;
forming a first protective layer so as to cover the top layer;
forming a metal layer mainly formed of aluminum so as to cover the first protective layer; and
at least partially removing the metal layer and the first protective layer to form a reflective section from the metal layer and expose only the flat area of the top surface of the top layer in the at least one of the terminal sections,
wherein before the step of forming the first protective layer, only the flat area of the top surface of the layer is exposed in at least one of the terminal sections so as to allow the first protective layer to contact the top layer along only the flat area.

2. A method for producing a reflection-type liquid crystal display device, including a first substrate; a second substrate; and a display medium layer interposed between the first substrate and the second substrate, wherein:
the first substrate includes a plurality of reflection pixel electrodes for applying a voltage to the display medium layer;
the second substrate includes a counter electrode located opposed to the plurality of reflection pixel electrodes;
the first substrate includes an insulating plate, and also includes, above a surface of the insulating plate opposed to the display medium layer, a plurality of thin film transistors respectively connected to the plurality of reflection pixel electrodes, a plurality of gate signal lines and a plurality of source signal lines connected to respective thin film transistors, a gate terminal section for supplying a scanning signal to the gate signal lines, a source terminal section for supplying a display signal to the source signal lines, and a common transfer terminal section for supplying a common signal to the counter electrode;
the thin film transistors each include a gate electrode connected to the respective gate signal line, a source electrode connected to the respective source signal line, and a drain electrode connected to the respective reflection pixel electrode; and
at least one of the gate terminal section, the source terminal section and the common transfer terminal section includes a top layer formed of ITO, only a flat area of a top surface of the top layer being exposed, the method comprising the steps of:

forming a first conductive layer on the insulating plate;
patterning the first conductive layer to form the gate signal lines and the gate electrodes;
forming a gate insulating layer substantially entirely on the insulating plate so as to cover at least the gate signal lines and the gate electrodes;

forming an ITO layer above the insulating plate;
patterning the ITO layer to form the top layer in the at least one of the terminal sections;
forming a first protective layer so as to cover the top layer;
forming a metal layer mainly formed of aluminum so as to cover the first protective layer; and
at least partially removing the metal layer and the first protective layer to form the reflection pixel electrodes from the metal layer and expose only the flat area of the top surface of the top layer in the at least one of the terminal sections,
wherein before the step of forming the first protective layer, only the flat area of the top surface of the layer is exposed in at least one of the terminal sections so as to allow the first protective layer to contact the top layer along only the flat area.

3. A method for producing a reflection-type liquid crystal display device, including a first substrate; a second substrate; and a display medium layer interposed between the first substrate and the second substrate,
wherein:
the first substrate includes a plurality of reflection pixel electrodes for applying a voltage to the display medium layer;
the second substrate includes a counter electrode located opposed to the plurality of reflection pixel electrodes;
the first substrate includes an insulating plate, and also includes, above a surface of the insulating plate opposed to the display medium layer, a plurality of thin film transistors respectively connected to the plurality of reflection pixel electrodes, a plurality of gate signal lines and a plurality of source signal lines connected to respective thin film transistors, a gate terminal section for supplying a scanning signal to the gate signal lines, a source terminal section for supplying a display signal to the source signal lines, and a common transfer terminal section for supplying a common signal to the counter electrode;
the thin film transistors each include a gate electrode connected to the respective gate signal line, a source electrode connected to the respective source signal line, and a drain electrode connected to the respective reflection pixel electrode; and
at least one of the gate terminal section, the source terminal section and the common transfer terminal section includes a top layer formed of ITO, only a flat area of a top surface of the top layer being exposed,
the method comprising the steps of:
forming a first conductive layer on the insulating plate;
patterning the first conductive layer to form the gate signal lines and the gate electrodes;
forming a gate insulating layer substantially entirely on the insulating plate so as to cover at least the gate signal lines and the gate electrodes;
forming an opening through the gate insulating layer in at least one of the terminal sections;
forming an ITO layer above the insulating plate;
patterning the ITO layer to form the top layer in the at least one of the terminal sections;
forming a first protective layer so as to cover the top layer;
forming a metal layer mainly formed of aluminum so as to cover the first protective layer; and
at least partially removing the metal layer and the first protective layer to form the reflection pixel electrodes from the metal layer and expose only the flat area of the top surface of the top layer in the at least one of the terminal sections,
wherein before the step of forming the first protective layer, only the flat area of the top surface of the layer is exposed in at least one of the terminal sections so as to allow the first protective layer to contact the top layer along only the flat area, and
the top layer is formed in the opening.

4. A method according to claim 1, wherein the top layer has a stepped peripheral portion, and the method further includes the step of forming a second protective layer so as to cover the stepped peripheral portion and expose only the flat area of the top surface of the top layer before the step of forming the first protective layer.

5. A method according to claim 3, wherein the top layer has a stepped peripheral portion, and the method further includes the step of forming a second protective layer so as to cover the stepped peripheral portion and expose only the flat area of the top surface of the top layer before the step of forming the first protective layer.

6. A method according to claim 2, wherein the step of forming the top layer includes the step of forming the top layer on the gate insulating layer, and the top layer is electrically connected to the gate signal lines through a through-hole formed in an area other than the at least one of the terminal sections.

7. A method for producing a circuit board, including an insulating plate and a terminal section formed on the base plate, the terminal section including a top layer formed of ITO, only a flat area of a top surface of the top layer being exposed, the method comprising the steps of:
forming an ITO layer above the insulating plate;
patterning the ITO layer to form the top layer in the terminal section;
forming a first protective layer so as to cover the top layer;
forming a metal layer mainly formed of aluminum so as to cover the first protective layer; and
at least partially removing the metal layer and the first protective layer to expose only the flat area of the top surface of the top layer in the terminal section,
wherein before the step of forming the first protective layer, only the flat area of the top surface of the layer is exposed in the terminal section so as to allow the first protective layer to contact the top layer along only the flat area.

8. A reflection-type liquid crystal display device, comprising:
a first substrate;
a second substrate; and
a display medium layer interposed between the first substrate and the second substrate,
wherein:
the first substrate includes a plurality of reflection pixel electrodes for applying a voltage to the display medium layer;
the second substrate includes a counter electrode located opposed to the plurality of reflection pixel electrodes;
the first substrate includes an insulating plate; and also includes, above a surface of the insulating plate opposed to the display medium layer, an ITO layer; a first protective layer; a plurality of thin film transistors formed of a metal layer mainly containing aluminum and provided on the first protective layer, the thin film transistors being connected to the plurality of reflection pixel electrodes; gate signal lines and source signal lines connected to the thin film transistors; a gate terminal section for supplying a scanning signal to the gate signal lines, a source terminal section for supplying a display signal to the source signal lines, and a common transfer terminal section for supplying a common signal to the counter electrode;

at least one of the gate terminal section, the source terminal section and the common transfer terminal section includes a top layer formed of ITO, only a flat area of a top surface of the top layer being exposed;

the first substrate further includes a gate insulating layer for covering at least the gate signal lines and gate electrodes;

the gate insulating layer has an opening in the at least one of the terminal sections; and the top layer is provided in the opening.

9. A reflection-type liquid crystal display device according to claim 8, wherein the top layer has a stepped peripheral portion, and the reflection-type liquid crystal display device further includes a second protective layer for covering the stepped peripheral portion and exposing only the flat area of the top surface of the top layer.

10. A reflection-type liquid crystal display device according to claim 8, further including another conductive layer formed of an identical material as that of the source signal lines, the top layer being provided on the another conductive layer.

11. A reflection-type liquid crystal display device according to claim 9, further including another conductive layer formed of an identical material as that of the source signal lines, the top layer being provided on the another conductive layer.

12. A reflection-type liquid crystal display device according to claim 8, wherein the top layer is provided inside the gate insulating layer so that an outer periphery of the top layer is distanced from an inner periphery of the gate insulating layer by more than zero and about 2 $\mu$m or less.

13. A reflection-type liquid crystal display device, comprising:

a first substrate;

a second substrate; and a display medium layer interposed between the first substrate and the second substrate, wherein:

the first substrate includes a plurality of reflection pixel electrodes for applying a voltage to the display medium layer;

the second substrate includes a counter electrode located opposed to the plurality of reflection pixel electrodes;

the first substrate includes an insulating plate; and also includes, above a surface of the insulating plate opposed to the display medium layer, an ITO layer; a first protective layer; a plurality of thin film transistors formed of a metal layer mainly containing aluminum and provided on the first protective layer, the thin film transistors being connected to the plurality of reflection pixel electrodes; gate signal lines and source signal lines connected to the thin film transistors; a gate terminal section for supplying a scanning signal to the gate signal lines, a source terminal section for supplying a display signal to the source signal lines, and a common transfer terminal section for supplying a common signal to the counter electrode;

at least one of the gate terminal section, the source terminal section and the common transfer terminal section includes a top layer formed of ITO, only a flat area of a top surface of the top layer being exposed;

the first substrate further includes a gate insulating layer for covering at least the gate signal lines and gate electrodes; and the top layer is provided on the gate insulating layer and is connected to the gate signal lines through a through-hole formed in an area other than the at least one of the terminal sections.

* * * * *